US012636784B2

(12) United States Patent
Campos Macias

(10) Patent No.: US 12,636,784 B2
(45) Date of Patent: May 26, 2026

(54) REAL-TIME MOTION AND PATH PLANNER FOR ROBOTS

(71) Applicant: Intel Corporation, Santa Clara, CA (US)

(72) Inventor: Leobardo Emmanuel Campos Macias, Guadalajara (MX)

(73) Assignee: Intel Corporation, Santa Clara, CA (US)

( * ) Notice: Subject to any disclaimer, the term of this patent is extended or adjusted under 35 U.S.C. 154(b) by 458 days.

(21) Appl. No.: 17/884,678

(22) Filed: Aug. 10, 2022

(65) Prior Publication Data

US 2024/0066698 A1 Feb. 29, 2024

(51) Int. Cl.
B25J 9/16 (2006.01)
B25J 13/08 (2006.01)

(52) U.S. Cl.
CPC ........... B25J 9/1666 (2013.01); B25J 9/1676 (2013.01); B25J 13/089 (2013.01)

(58) Field of Classification Search
CPC ...... B25J 9/1666; B25J 9/1676; B25J 13/089; G05B 2219/40476
See application file for complete search history.

(56) References Cited

U.S. PATENT DOCUMENTS

| | | | | |
|---|---|---|---|---|
| 9,427,874 | B1 * | 8/2016 | Rublee | ................. B25J 11/0075 |
| 11,911,908 | B2 * | 2/2024 | Dupuis | ................. G05D 1/617 |

| | | | | |
|---|---|---|---|---|
| 2009/0234499 | A1 * | 9/2009 | Nielsen | .................... B25J 9/161 |
| | | | | 700/250 |
| 2019/0160677 | A1 * | 5/2019 | Strandberg | ............... B25J 9/163 |
| 2019/0240833 | A1 * | 8/2019 | Kimura | .................. B25J 9/1651 |
| 2020/0398428 | A1 * | 12/2020 | Murray | .................. B25J 9/1605 |
| 2021/0178591 | A1 * | 6/2021 | Floyd-Jones | .......... B25J 9/1671 |

OTHER PUBLICATIONS

Chamzas, Constantinos et al., "MotionBenchMaker: A Tool to Generate and Benchmark Motion Planning Datasets", IEEE, Feb. 5, 2022, 8 pages, IEEE Robotics and Automation Letters, arXiv.

(Continued)

*Primary Examiner* — Wade Miles
*Assistant Examiner* — Mohammed Yousef Abuelhawa
(74) *Attorney, Agent, or Firm* — Viering, Jentschura & Partner mbB

(57) ABSTRACT

Disclosed herein are systems, devices, and methods for real-time motion and path planning. The real-time motion and path planner may generate occupancy information about an environment around a robot. The occupancy information represents defined volumes of space of the environment, and each defined volume of space is associated with a corresponding occupancy probability. The motion/path planner also determines a sequence of robot configurations between a starting and a target configuration based on the occupancy information, wherein the sequence of robot configurations defines poses of the robot that occupy selected ones of the defined volumes of space. The motion/path planner also generates an instruction for the robot based on the sequence of robot configurations, wherein the instruction includes trajectory information to control the robot to move from the starting configuration to the target configuration through the sequence of robot configurations.

22 Claims, 8 Drawing Sheets

(56)     References Cited

OTHER PUBLICATIONS

Hornung, Armin et al., "OctoMap: an efficient probabilistic 3D mapping framework based on octrees", 2013, 17 pages, Autonomous Robots.

La Valle, Steven M. et al., "Rapidly-Exploring Random Trees: Progress and Prospects", Jan. 2000, 19 pages.

Li, Miao et al., "Learning task manifolds for constrained object manipulation", 2018, pp. 159-174, Autonomous Robots.

Hisu, David et al., "Path planning in expansive configuration spaces", IEEE, Apr. 25, 1997, pp. 2719-2726, Proceedings of International Conference on Robotics and Automation, Albuquerque, NM, USA.

Sucan, Ioan A. et al., "Kinodynamic Motion Planning by Interior-Exterior Cell Exploration", 2009, pp. 449-464, Algorithmic Foundation of Robotics VIII, Springer.

* cited by examiner

800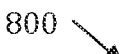

| Generating occupancy information about an environment around a robot, wherein the occupancy information represents defined volumes of space of the environment, wherein each defined volume of space is associated with a corresponding probability of whether the defined volume of space is occupied |
810

| Determining a sequence of robot configurations between a starting configuration and a target configuration based on the occupancy information, wherein the sequence of robot configurations defines poses of the robot that occupy selected ones of the defined volumes of space in which the corresponding probability satisfies a predefined criterion |
820

| Generating an instruction for the robot based on the sequence of robot configurations, wherein the instruction includes trajectory information to control the robot to move from the starting configuration to the target configuration through the sequence of robot configurations |
830

FIG. 8

REAL-TIME MOTION AND PATH PLANNER FOR ROBOTS

TECHNICAL FIELD

The disclosure relates generally to robot movement planning, and in particular, to systems, devices, and methods that plan robotic movements, including robots that operate in complex environments where other humans may be in the vicinity of the robot and/or collaborating with the robot.

BACKGROUND

Autonomous robots are becoming increasingly widespread in work and personal environments. As the number of robots in such environments increases, so does the risk of hazardous interactions among robots and humans in shared spaces. Due to their size and cost, many robots may have limited processing and memory storage capabilities, which means that the processing and memory requirements for motion planning may be limited. As a result, it may not be possible for robots to safely operate in complex environments where the robot must efficiently and accurately monitor whether humans, robots, or other dynamic objects may be within the robot's movement path.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary aspects of the disclosure are described with reference to the following drawings, in which:

FIG. 8 depicts an exemplary schematic flow diagram of a method for real-time motion and path planning for avoiding dynamically detected obstacles that may be relevant to a robot's motions.

DESCRIPTION

Figure 1:
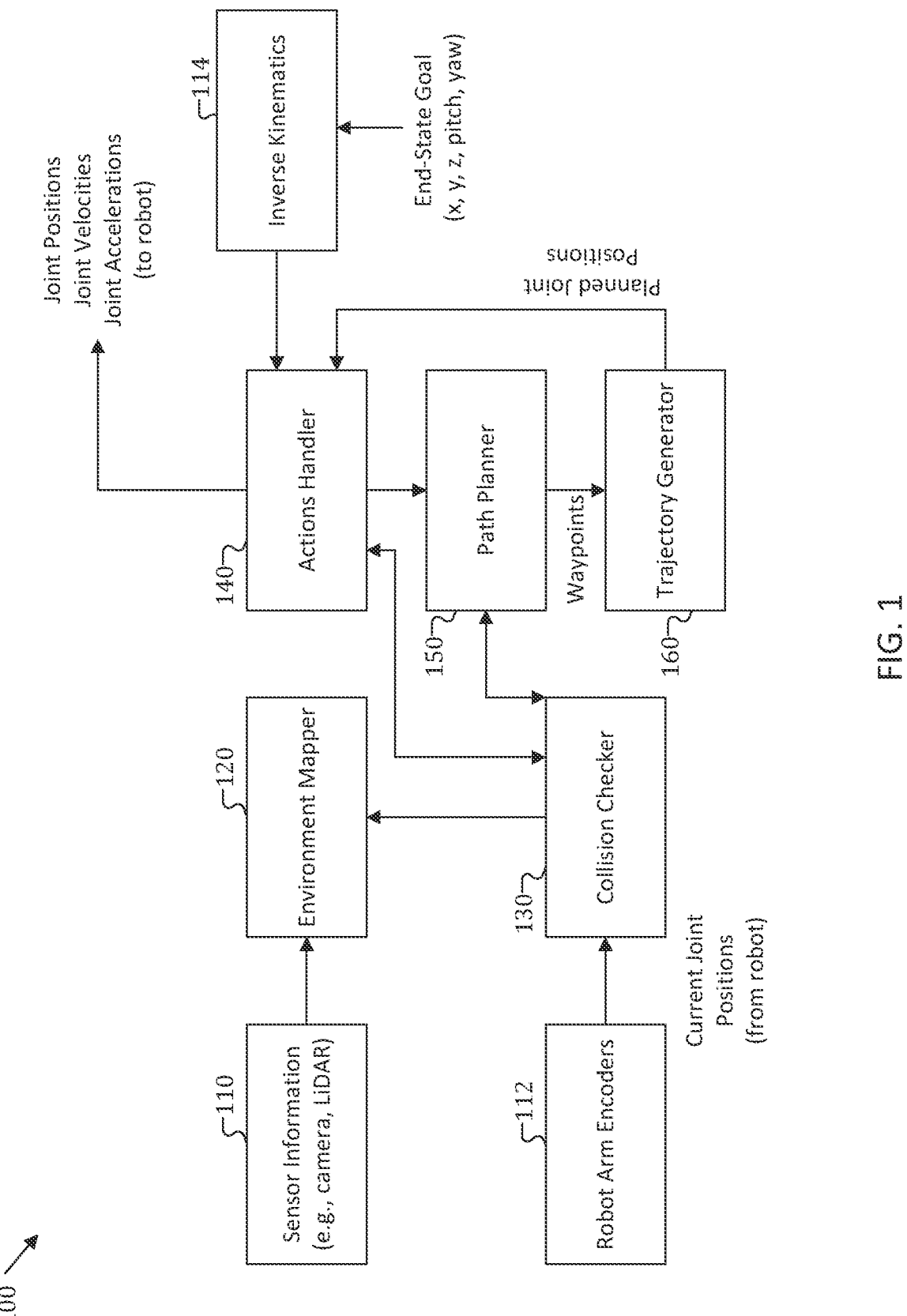
FIG. 1 shows an exemplary framework for a real-time motion and path planner for avoiding dynamically detected obstacles that may be relevant to a robot's motions.

The following detailed description refers to the accompanying drawings that show, by way of illustration, exemplary details and features.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc., where "[ . . . ]" means that such a series may continue to any higher number). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements] ") referring to a quantity of elements expressly refers to more than one of the said elements. For instance, the phrase "a plurality" may be understood to include a numerical quantity greater than or equal to two (e.g., two, three, four, five, [ . . . ], etc., where "[ . . . ]" means that such a series may continue to any higher number).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both "direct" calculations via a mathematical expression/formula/relationship and "indirect" calculations via lookup or hash tables and other array indexing or searching operations.

A "robot" may be understood to include any type of digitally controllable machine that is designed to perform a task or tasks. By way of example, a robot may be an autonomous mobile robot (AMR) that may move within an area (e.g., a manufacturing floor, an office building, a warehouse, etc.) to perform a task or tasks; or a robot may be understood as an automated machine with arms, tools, and/or sensors that may perform a task or tasks at a fixed location; or a combination thereof. In addition, reference is made herein to a "human" or a "person" that may collaborate or share a space with a robot. As should be appreciated, the disclosed systems, methods, and devices, are not limited to strictly human collaborations and it should be understood that a "person" or "human" may in fact be non-human entities or other dynamic objects that may share a space with, come into close proximity with, or collaborate with a robot.

As robots become more prevalent in our daily lives, it is more likely that robots will operate in shared spaces, where aspects of the shared space may be constantly changing, such as when human workers may interact with robots, the robot moves to different locations to perform tasks, or dynamic objects may move within the robot's workspace. When there is the possibility that the robot's task may result in contacting a nearby human or other objects within the robot's workspace, it may be important to monitor the environment for possible collision hazards, which may change dynamically over time. However, real-time monitoring of the robot's environment may come with high demands for computing resources and/or memory resources that may be unavailable on a robot, where sensing, processing, storage, and decision-making capabilities may be limited. For example, conventional environmental monitoring and motion planning systems typically map the entire environment over a three-dimensional grid and then separately plan the robot's path from starting position to an ending position. If a wide grid spacing is used so that computational costs are lower, this may lead to identifying too many spaces as occupied and thereby overly restricting the movements of the robot. If a narrow grid spacing is used in order to achieve higher resolution sufficient to avoid overly restricting the movements of the robot. However, this higher resolution and narrower grid spacing over the entire three-dimensional grid may come with a high processing and/or memory cost that may put too high of a demand on the robot's capabilities.

As should be apparent from the detailed disclosure below, the disclosed real-time motion and path planner combines mapping with planning so that motion planning may efficiently take into account the dynamic changes in the nearby environment that may impact the robot's positions. The real-time motion and path planner utilize a fast free-space mapping representation of the environment around the robot that may provide a memory and computationally efficient method of representing and detect occupied portions of the environment that may be relevant to the path planning. The real-time motion and path planner may also generate a sequence of joint positions (e.g., waypoints) for each degrees of freedom (DoF) of the robot, where the DoFs are bounded by physical restrictions. The real-time motion and path planner may also generate trajectories to reach the waypoints in a way that fulfill the dynamic constraints of the robot.

FIG. 1 shows a high level view of an exemplary framework for a real-time motion and path planner 100 that may avoid collisions with dynamic obstacles in areas that may be relevant to the robot's movements. Actions handler 140 may be responsible for producing a new motion plan for a robot's motion, where the motion may be part of the activity/activities the robot is designed to perform. The actions handler 140 may receive an end-state goal (e.g., a target configuration of the robot (e.g., a desired position/pose of the end-effector/tool of the robot)) and request that the path planner 150 determine a series of waypoints from the robot's starting configuration (e.g., current pose) to the goal configuration (e.g., target pose). The actions handler 140 may receive the end-state goal of the robot via an inverse kinematics algorithm 114 that may determine a set of possible joint configurations that achieve the desired end-state configuration. For example, depending on the number of degrees of freedom and the desired end-state of the manipulator/tool piece, a number of different sets of joint configuration permutations may satisfy the end-state goal (e.g., due to redundancies in the joints or flexibility as to allowed end-positions/poses of the manipulator/tool piece). The actions handler 140 may provide to the path planner 150 the set(s) of permissible joint configurations that satisfy the end-state goal.

The path planner 150 may utilize the set(s) of permissible joint configurations and information from a collision checker 130 to generate waypoints along a path from the starting state to the end-state(s) that avoids occupied space. The collision checker 130 may check the occupancy of spaces along the path from the robot's starting state to the end-state goal (or along intermediate segments thereof (e.g., between waypoints)) to determine whether the space that the robot will traverse along the path is occupied or free, and provide this information back to path planner 150. The collision checker 130 may use static information about the robot (e.g., its size, shape, arm length, tool size, other physical characteristics, etc.) and dynamic information from, for example, the robot arm encoders 112 to determine the robot's current state. The collision checker 130 may also use occupancy information provided from an environment mapper 120 about the occupancy state of the environment around the robot. The environment mapper 120 may receive sensor information 110 about the environment around the robot to map the environment. The sensor information 120 may be received from sensors such as cameras (e.g., red-green-blue cameras, infrared cameras, depth cameras), proximity sensors, motion sensors, light detection and ranging (LiDAR) sensors, or any other type of sensor that may provide information about the environment around the robot. This sensor information 110 may then be mapped to a container that represents defined volumes of space around the robot and whether each defined volume is occupied by another object (and therefore the defined volume should be avoided) or whether each defined volume is free of objects (and therefore safe for the robot to move through/occupy the defined volume).

Once the path planner 150 has determined a series of collision-free waypoints from the starting state to the goal, a trajectory generator 160 may utilize these waypoints to plan the trajectory of the robot along the series of waypoints. The trajectory may include configuration information for the robot, for example, the planned joint positions of the robot for each degree of freedom for each of the various links that may make up the robot's manipulator arm, and it may also include the associated joint velocity, joint accelerations, joint jerk, joint snap, etc. for the corresponding joint positions. As the environment may change dynamically over time as the robot moves along the series of waypoints, the actions handler 140 may review the planned joint positions (e.g., at later points in time), e.g., via the collision checker 130, to determine whether the planned joint position(s) remain obstacle free. If not, actions handler 140 may request new waypoints from the path planner 150. If the planned joint position(s) remain obstacle free, they may be transmitted as verified joint position(s) and other trajectory information to the robot (e.g., as instructions) for controlling the robot's motion (e.g., rotation of the joints) according to the verified trajectory information.

Figure 2:
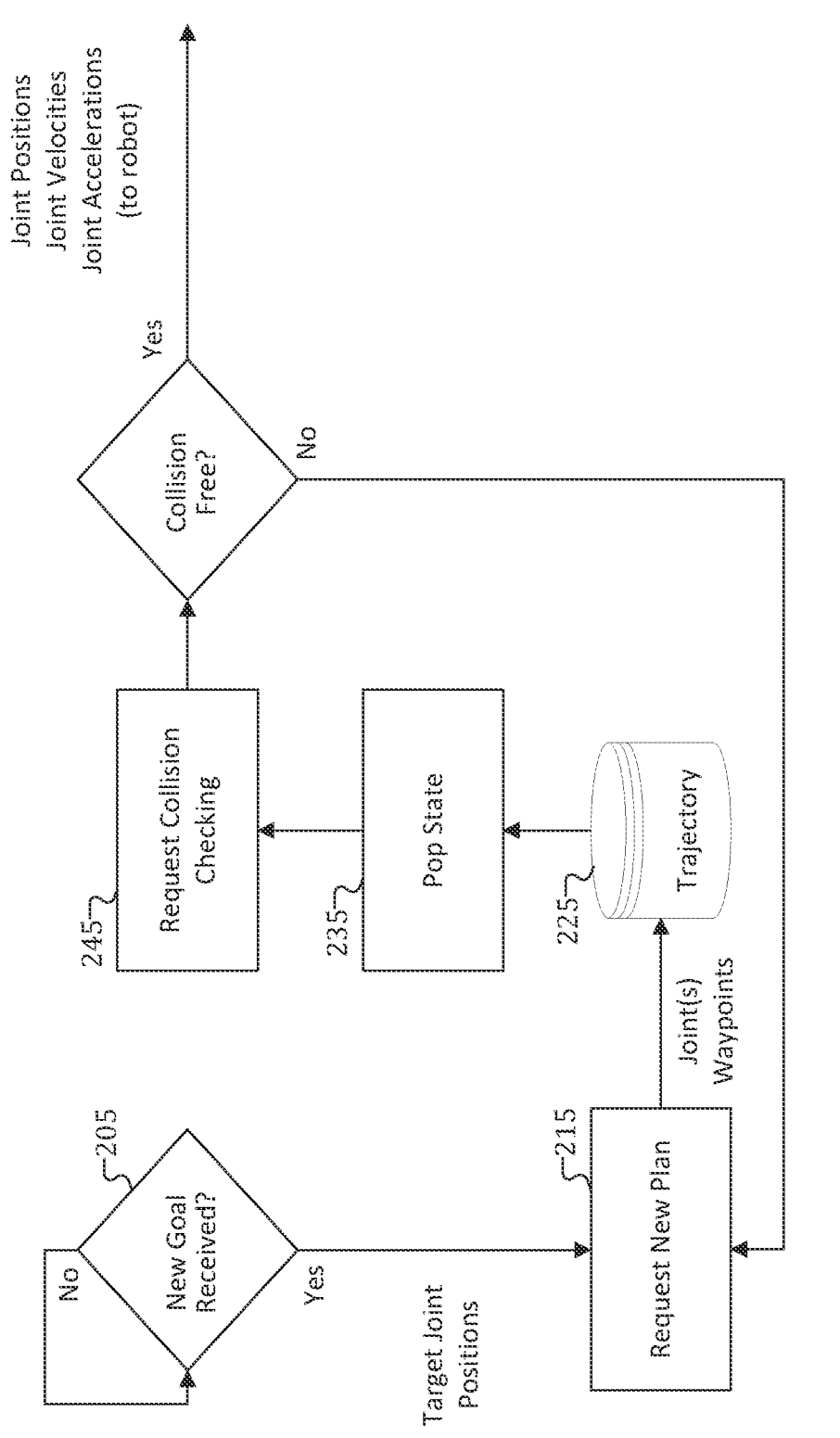
FIG. 2 shows an exemplary flowchart of logic for implementing newly received motion plans as part of a real-time motion and path planner for a robot.

FIG. 2 shows a flowchart of an action handler 200 for motion-related planning that may be or be part of a real-time motion and path planner for a robot (e.g., real-time motion and path planner 100). The action handler 200 may be configured to receive, in 205, new motion-related goals for the robot (e.g., a defined configuration for an end-effector/tool of the robot). As should be appreciated, new motion-related goals may arrive at any time, and the action handler 200 may continuously monitor whether it has received a new goal for the robot (e.g., monitoring in real-time, at irregular or regular intervals, and/or in response to a trigger). After a goal is received, the action handler 200 may provide the goal (e.g., the target configuration of joint positions, velocities, accelerations, etc. for a particular time) and, in 215, request a new plan (e.g., from path planner 150). The action handler 200 may request a plan based on a starting state (e.g., starting configuration) in which the robot is expected to be at a given point of time in the future. For example, the starting state, x, may be defined at a future point in time, $t_{plan}$, and thus the starting state is given by $x(t=t_{plan})$, the starting state may include configuration information such as the joint positions and associated information (e.g., angular position q(t), angular velocity q̇(t), angular acceleration q̈(t), angular jerk $[|$]$$·$$[|$]$·Ad\dot{q}(t)$, etc.), such the state may be expressed as $x(t)=[q(t), \dot{q}(t), \dot{q}(t), [|$]$·$$[|$]·$Ad\dot{q}(t) \ldots ]$ for the set of starting configuration parameters. If the robot is not currently moving, then $x(t=t_{plan})$ returns the current state of the robot at rest.

This information, together with the target configuration (e.g., the target end-effector position and associated information) and the current map of the environment around the robot with occupancy information, the returns a set of joint waypoints to the target configuration that avoids occupied space. The waypoints also return, in 225, trajectory information for driving the arm from its configuration at time $t_{plan}$ towards the goal configuration while avoiding collisions. A low-level trajectory tracking controller may consume this trajectory information as time advances by taking the next trajectory state, in 235, from the trajectory information in order to drive the robot's motion (e.g., rotate the joint(s) of the robot's arm(s) accordingly). Before the action handler 200 forwards the next state x(t) to the motion controller, it may, in 245, make a collision checking request (e.g., via collision checker 130) using the most recent map representation of occupancy information, which it may have refreshed more recently than the time at which it originally planned the trajectory. If the collision checking request returns a collision, the next trajectory state is no longer valid (e.g., it is now unsafe). Instead of forwarding the next trajectory state to the motion controller, the action handler 200 may request a new motion plan to take into account the updated occupancy information.

Figure 3:
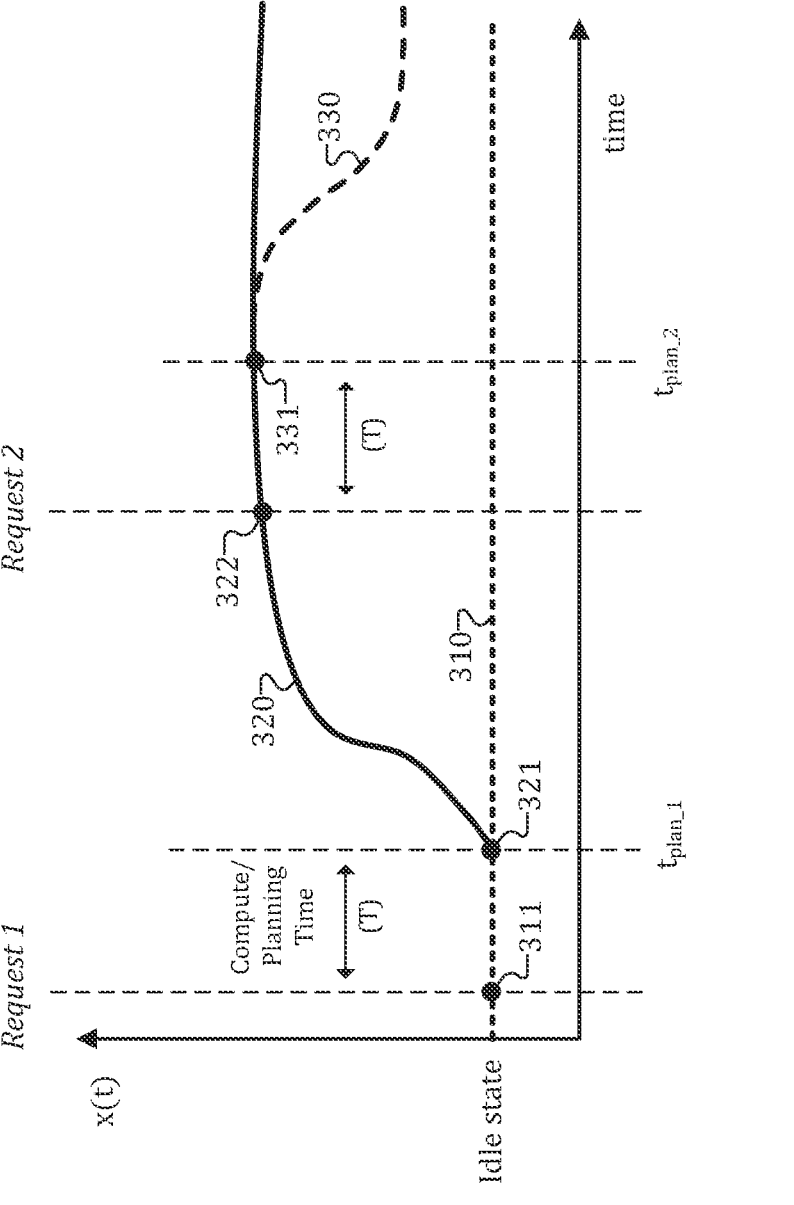
FIG. 3 depicts an exemplary plot of trajectory states that account for computational timing when planning newly requested targets.

Given that motion planning may take a certain amount of computational time to generate the trajectory information, the time of $t_{plan}$ may be set far enough ahead of the current time ($t_{current}$) to account for the computational time ($t_{comp}$). This helps avoid discontinuities in the trajectory. Thus, $t_{plan}=t_{current}+t_{comp}$. For example, FIG. 3 shows an exemplary plot 300 of trajectory states that may take into account computation time (T) as new goals are requested. The x-axis of plot 300 is time t and the y-axis of plot 300 is the trajectory state x(t). Line 310 shows the idle state of the robot, line 310 shows the trajectory states that are responsive to a first request (Request 1), and line 320 shows the trajectory states that are responsive to a second request (Request 2).

In order for the real-time motion and path planner to account for the computation time (T) it may take to compute/plan trajectories, the time associated with the start of the trajectory ($t_{plan\_1}$) may be after a minimum amount of time from receiving Request 1. Thus, the time difference between point 311 (when Request 1 is received) and point 321 (when movement associated with Request 1 is planned to start) may be a time T. If the request arrives when the robot is in the idle state, as is the case with Request 1, the planned starting state is simply the idle state. However, if the request arrives when the robot is in motion, as is the case with Request 2, the planned starting state for the new request may be the state along the previously requested trajectory. So, if Request 2 arrives at a time associated with point 322, for example, the starting state for planning Request 2's trajectory may be the state at point 331 associated with time $t_{plan\_2}$, which may be at least a time T after receiving Request 2. After point 331, the trajectory would then follow the states along line 330, which is associated with Request 2.

As noted above with respect to FIG. 1, an environment mapper 120 may receive sensor information 110 about the environment around the robot in order to map the environment. Importantly, this map may be adaptable to the particular portion(s) of space that may be relevant to the path planning so that the environmental mapper 120 need not uniformly map the entire area around the robot. For example, the environment mapper 120 may use a linear octree with L levels and axes-aligned bounding boxes (e.g., voxels) that contain occupancy information for each bounding box. For example, when a sensor provides data about the environment (e.g., a point cloud list of image data), the environment mapper 120 may project occupied pixels into 3D-space in the world coordinate system represented by the linear octree of bounding boxes (e.g., a collection of voxels that may be at different levels). Then, the environmental mapper 120 may generate a bounded key (e.g., a container) for each bounding box that includes a level code indicating the depth 1 in the linear octree (e.g., key. level=l) and a spatial code that indicates the central three-dimensional point in the bounding box (e.g., the voxel) having a radius r at level 1. The environmental mapper 120 may generate the spatial code using the following formula:

$$\text{key.spatial}(x,\ y,\ z,\ l) = cat\{\overline{x},\ \overline{y},\ \overline{z}\}$$

where $$\overline{x} = \left\lfloor \frac{x}{r2^{L-l}} \right\rfloor,\ \overline{y} = \left\lfloor \frac{y}{r2^{L-l}} \right\rfloor,\ \overline{z} = \left\lfloor \frac{z}{r2^{L-l}} \right\rfloor$$

In the above formula, $cat\{\overline{x},\ \overline{y},\ \overline{z}\}$ concatenates its arguments represented in m digits and the brackets $\lfloor\ \rfloor$ represent the floor operation. Note that this may be a bijective hash function, permitting the recovery of the box's (e.g., the voxel's) central three-dimensional point with radius r at level 1.

Figure 4:
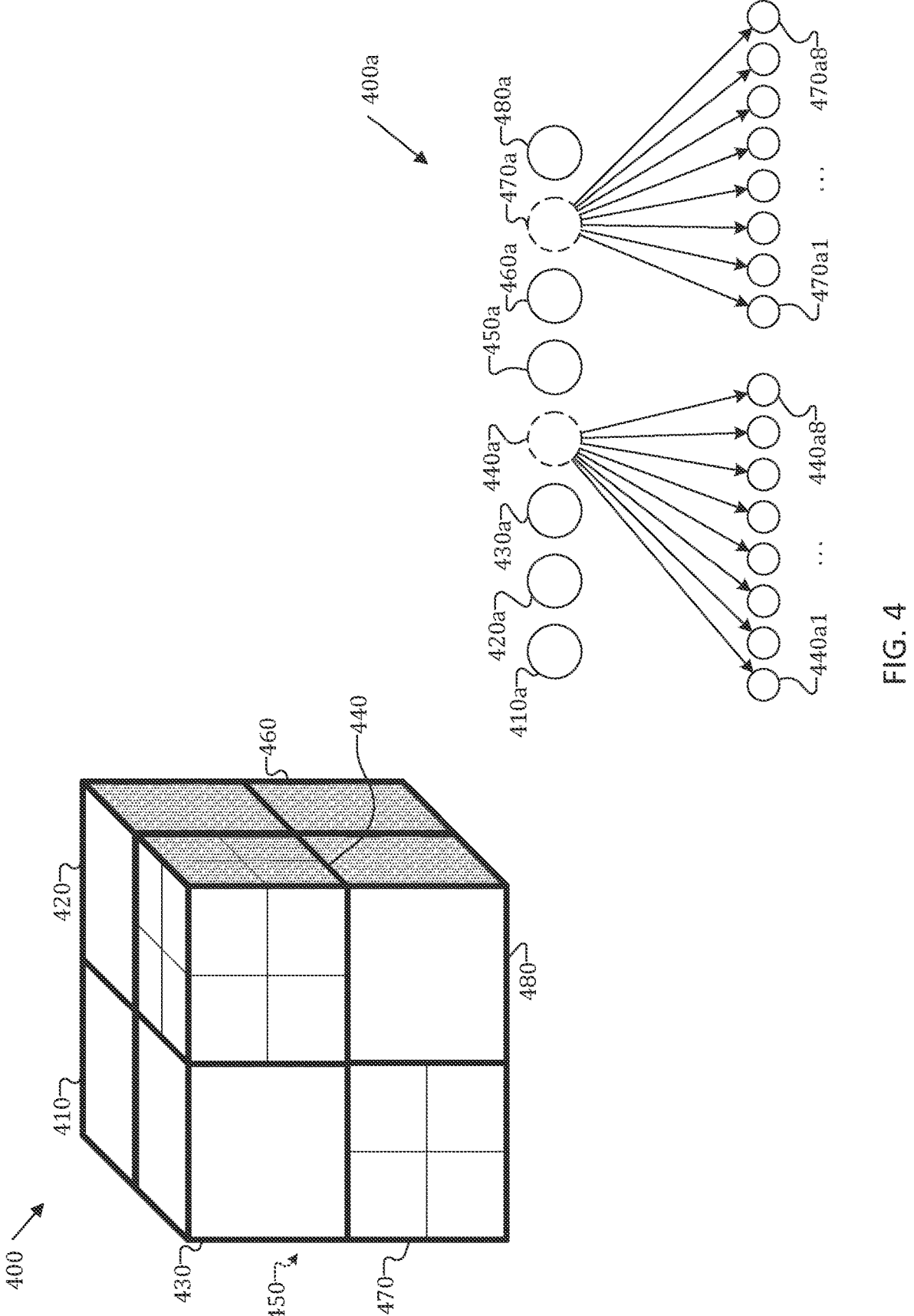
FIG. 4 depicts an exemplary division of space into voxels of varying size at different levels that that may contain occupancy information about an environment around a robot.

FIG. 4 shows a graphic depiction of a volume representation 400 of a linear octree with L levels and axes-aligned bounding boxes. For example, the volume representation 400 may be divided into 8 axis-aligned bounding boxes at a first level (e.g., voxel 410, 420, 430, 440, 450 (not visible because it is behind 470 and below 410), 460, 470, and 480), where each bounding box may be understood as a defined volume of space. In the example of FIG. 4, voxels 440 and 470 each include a second level where each first level voxel has been subdivided into 8 additional voxels at the second level. FIG. 4 also shows a graphical depiction of a data structure representation 400a corresponding to the volume representation 400, where each voxel may have a corresponding data container for storing (e.g., in a memory) information about the particular voxel (e.g., occupancy information for whether a portion of the volume of space defined by the voxel is occupied). Thus, voxel 410 corresponds to data container 410a, voxel 420 corresponds to data container 420a, voxel 430 corresponds to data container 430a, voxel 450 corresponds to data container 450a, voxel 460 corresponds to data container 460a, and voxel 480 corresponds to data container 480.

What would normally correspond to voxel 440 (e.g., data container 440a) has been shown with a hashed line because a data container need not exist at this level because it is a parent voxel has been further subdivided into child voxels a lower layer (e.g., 8 voxels at the lower layer including voxels 440a1 through 440a8). The same is true for what would normally correspond to voxel 470, where data container 470a has been shown with a hashed line because a data container need not exist at this level because it (e.g., the parent voxel) has been further subdivided into 8 voxels at a lower layer (e.g., 8 "child" voxels at the lower layer including voxels 470a1 through 470a8). Because these parent voxels (e.g., voxel 440 and 470) have been subdivided into child voxels, the parent voxels need not be stored in memory, allowing for improved efficiencies in memory use. In addition, the because the hash key is used to store the voxel coordinates, this may also allow for more efficient memory usage. To save processing time, the children may be subdivided on the fly, depending on the resolution of sensor data and the precision with which each defined volume of space should be monitored. In addition, the children may be subdivided on the fly depending on whether new occupancy information is received for a given voxel (e.g., new sensor data has been updated for a coordinate within the defined volume of space for the voxel).

With FIG. 4 in mind and as noted earlier, the environmental mapper 120 may generate different keys (e.g., using the key.spatial formula discussed above) to generate different keys from the root level l=0 up to l=L. When the key is found that corresponds to the voxel that contains the coordinate of interest (e.g., a point along a line that is being checked by the collision checker 130 for occupancy or by the path planner 150 to construct waypoints), the environmental mapper 120 may return the semantic information associated with the voxel. In particular, the semantic information may include whether the defined volume of space associated with the voxel is occupied or free. The environment mapper 120 may store this information as a probability of whether the space is occupied or free, and the environment mapper 120 may base the probability on sensor data for the defined volume of space associated with the voxel. For example, to account for characteristics of the sensor data (e.g., noise, inaccuracies, etc.), a log-odds occupancy model may be used, where the voxel's probability of occupancy (voxel.occ) may be expressed as:

$$voxel.occ = voxel.occ + k(1 + voxel.occ)$$

Then, based on the probability, the environment mapper 120 may determine whether to treat the voxel as occupied or free based on whether the probability of occupancy satisfies a predefined threshold or thresholds. For example, the occupancy status (e.g., free, occupied, unknown, etc.) may be based on whether the probability of occupancy exceeds a minimum occupancy threshold ($p_o$), whether the probability of occupancy falls below a minimum free space threshold ($p_f$), etc. For example, the occupancy status for a voxel may be determined with the following formula:

$$status = \begin{cases} \text{occupied} & voxel.occ > p_o \\ \text{free} & voxel.occ < p_f \\ \text{unknown} & \text{otherwise} \end{cases}$$

The real-time motion and path planner (e.g., real-time motion and path planner 100) may store in memory, for each voxel, at least the level, the voxel center coordinates, and the occupancy probability. The level and the coordinates may be embedded in the hash function (discussed above) of the voxel and the occupancy status may be stored in a property of the voxel. In some cases, memory storage of 64 bits for the hash function may be sufficient to represent the reachable volume of a robot's manipulator arm/tool. For example, 16 bits for each of the x, y, and z coordinates and 16 bits for the level l) and an additional 8 bits for the occupancy status of the voxel. As noted earlier, this type of structure may be memory efficient because the hash key may be used to store the voxel coordinates and because the parents of the lower-level voxels need not be maintained in memory.

As noted above with respect to FIG. 1, a path planner 150 may determine a series of waypoints from a starting configuration (e.g., current pose) of the robot to the target configuration (e.g., target pose) of the robot. The path planner 150 may ensure that the waypoints satisfies the physical limitation of the robot (e.g., joint space limits) and also that, when the robot follows a trajectory through the waypoints, the determined waypoints provide a collision-free path. Indeed, the trajectory generator 160 may use the determined waypoints to generate the final trajectory that the actions handler 140 may send to the low-level controller for controlling the motion of the robot.

The pseudocode provided and discussed below is one non-limiting example of how the path planner 150 may be implemented:

```
INPUT: pose_EE, q_0
OUTPUT: σ(q)
    q_f ← IK_FAST(pose_EE)
    start_tree ← INSERT(q_0)
    end_tree ← INSERT(q_f)
    connected_nodes = empty
    DO
        WIRE_TREE(start_tree)
        WIRE_TREE(end_tree)
    WHILE time_out == false
    IF connected_nodes is not empty
        σ(q) ← CREATE_SOLUTION( )
    ENDIF
```

The exemplary algorithm above may accept as inputs the desired configuration/pose of the end-effector/tool ("POSE_EE") and the starting joint configuration (q_0). The inputs may be provided by an action handler (e.g., action handler 110) that is configured to monitor and handle changing states of the robot. The output may be a sequence of joint configurations (e.g., positions, velocities, accelerations, etc.) provided to a low-level controller that drives the robot arm along waypoints towards the desired end-effector's pose.

The algorithm may start by determining the inverse kinematics of the desired POSE_EE. As should be appreciated, any type of inverse kinematics algorithm may be used and the algorithm may return not just a single joint configuration for the desired POSE_EE, but rather a set of possible joint configurations that may result in the desired POSE_EE. There may be multiple possible joint configurations due to redundancy of joint movements or other geometrical methods (e.g., achieving the pose by reaching the pose with an elbow upwards or downwards. The algorithm may insert this set of possible joint configurations for the desired pose_EE (q_f) as root nodes in the END_TREE graph. The algorithm may also insert the initial configuration (q_0) as the root node in the START_TREE graph. Then, the algorithm may create multiple instances of the WIRE_TREE functions, as many as possible during an allowed period for planning. Once the time period allowed for planning expires or once an obstacle-free connection between START_TREE and END_TREE graph is found, the algorithm selects a solution (e.g., one of the WIRE_TREE instances) by taking the sequence of nodes (e.g. waypoints) that interconnects the root node in the START_TREE with a root node in the END_TREE.

One non-limiting example of how the WIRE_TREE algorithm may be implemented is provided in the pseudocode below:

```
WIRE_TREE
    q_r ← RANDOM( )
    q_nearest ← NEAREST(q_r, tree)
    q_closest = q_nearest[0]
    IF COLLISION_FREE(q_r, q_closest)
        tree ← INSERT(q_r)
        FOR EACH q_near IN q_nearest
            IF COLLISION_FREE(q_r, q_near)
            IF IMPROVED_DISTANCE(q_r, q_near)
                tree ← REWIRE (q_r, q_near)
            ENDIF
            ENDIF
        ENDFOREACH
        connected_nodes ← CONNECT_OTHER_TREE( )
    ENDIF
```

The WIRE_TREE algorithm may randomly sample joint configurations from a uniform distribution of the permissible range of joint positions (e.g., joints configuration that are between minimum and maximum: $q_{min} < q_c < q_{max}$). Sampling from the permissible range of joint positions may ensure that any solution provided by the WIRE_TREE algorithm remains inside the physical possibilities/limits of the robot and this particular joint. Next the algorithm selects the nearest nodes (e.g., voxels) within a bound radius of the particular graph (e.g., either the END_TREE or START_TREE graph, depending on which graph was used when calling the WIRE_TREE algorithm from within the DO/LOOP in the earlier pseudocode). For example, the nearest node may be found by the nearest L1-norm inside a given radius r, where d is the dimension of the sampling space corresponding to the degrees of freedom of the robot, $\mu(X_{free})$ is Lebesgue measure (e.g., the volume) of the obstacle-free space, and $\zeta_d$ is the volume of the unit ball in the d-dimensional Euclidean space:

$$\Upsilon_{PRM} > \Upsilon_{PRM}^* = 2(1 + 1/d)^{1/d}(\mu(\chi_{free})/\zeta_d)^{1/d}$$

$$r = \Upsilon_{PRM}\left(\frac{LOG(\#(G))}{\#(G)}\right)^{1/d}$$

As should be appreciated in the exemplary formula above, the # operation represents the cardinality of the set, which in this case is the number of nodes in the current tree, either END_TREE or START_TREE. If no nearest node is found within the bound radius, the algorithm may select the closest node. Next, the algorithm may assess whether a collision-free path may be constructed from the selected closest/nearest node to the random sample (e.g., using interpolation between q_r and q_closest, described in more detail below with respect to the collision checker 130). If a collision-free path is not possible, the selected closest/nearest node is rejected, and a new random sample is chosen from the uniform distribution of the permissible range of joint positions and the nearest node process is repeated.

If a collision-free path is found, this path is added to the corresponding graph, using the selected closest node as the parent of this particular graph. Then, the algorithm reviews the remaining nearest nodes within the bounded radius for possible alternative connections that may, for example, reduce the cost (e.g., shorter distance traveled). Finally, the algorithm may use the opposite graph to determine whether a collision-free connection can be made between the random sample node and the nodes on the opposite graph, and if so, whether the connection provides a lower cost (e.g., shorter distance traveled). In other words if the algorithm called WIRE_TREE in order to determine connections from START_TREE to END_TREE, then the algorithm may use the "opposite" direction (from END_TREE to START_TREE) to try to find a lower-cost, collision-free connection.

The collision checker 130 may perform a collision check discussed above with respect to the WIRE_TREE algorithm (e.g. COLLISION_FREE), where it checks whether the space traversed by the robot between two configurations is occupied or free. As noted earlier, conventional collision checking is typically one of the most computational/resource-intensive aspects of motion planning frameworks. The collision checker 130 may improve computational efficiency by taking advantage of the linear octree structure used to map the environment around the robot. To determine whether the space that the robot will traverse along the path between two states is occupied or free, the occupancy status of the voxels along the path may be checked, using the key structure discussed above and a line representation of the robot for each joint configuration. The algorithm may call the COLLISION_FREE free function to compute the subset of configurations that interconnects both inputs (e.g., q_r, q_closest or q_r, q_near), and for each one, generates lines that describe the links of the robot, and for each line, an occupancy check may be performed. An exemplary pseudo-code algorithm the collision checker 130 may use to check the occupancy of a given line is listed below:

```
OCCUPANCY_CHECK
INPUT: key, line
OUTPUT: collision free
    if key.level = L then
        v ← GetVoxel(key)
        if Intersection(line, v) and v ⊆ V*_occ[k] then
            return FALSE
        else
            return TRUE
        end if
    else
        children ← GetChildren(key)
        for each child in children
            if DetectCollision(child, line) then
                return FALSE
            end if
        next child
        return TRUE
    end if
```

The algorithm receives as an input a line to be tested and the key of a voxel that contains both ends of the line. In other words, the voxel should contain the entire line. The algorithm may find this voxel by recursively generating the keys for both points, starting at the child level and each time moving up to its parent level until the keys are the same. Then, the algorithm tests for collisions at all levels by recursively testing each voxel, starting from the highest key.level to key.level=L.

Figure 5:
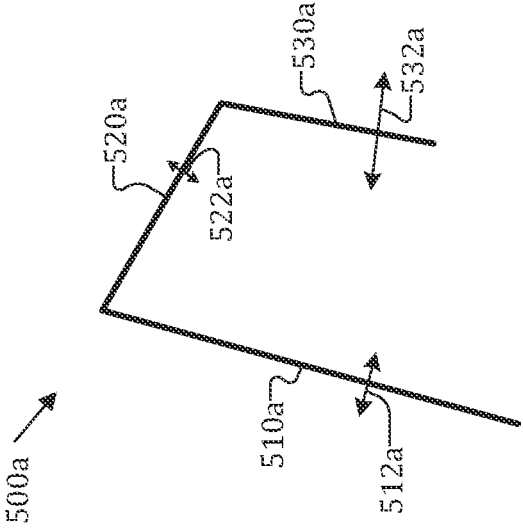
FIG. 5 shows any exemplary robot arm with multiple links along side a line representation of the exemplary robot.
Figure 5:
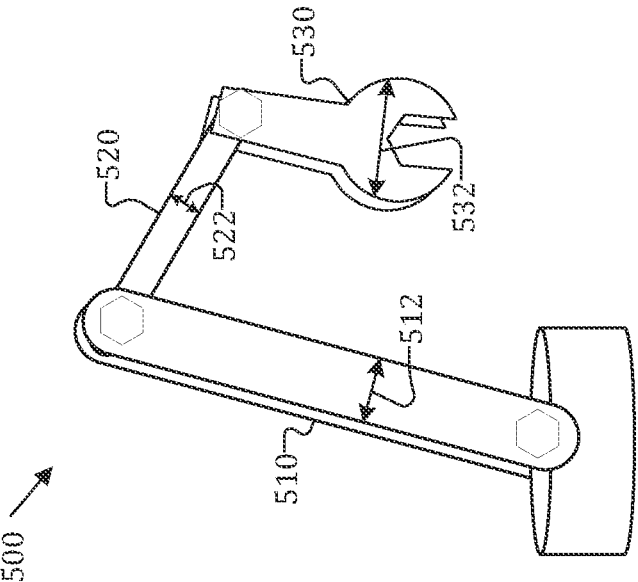

The line that the collision checker 130 tests may be a straight line that connects the two endpoints of a link of the robot's arm for a given joint configuration. In other words, the line may be a "stick" in a stick-figure representation of the robot's movable arm. A robot with multiple links in the arm may have a number of such line segments, each associated with a different link of the robot's moveable arm, where each segment of the line may be tested against the occupancy map of the environment. For example, a simple robot arm 500 is shown in FIG. 5 along side its line representation 500a. In this simple example, robot arm 500 includes link 510, link 520, and manipulator link 530. The line representation 500a includes a line 510a that corresponds to link 510, a line 520a that corresponds to link 520, and line 530a that corresponds to manipulator link 530. For a given set of joint configurations, each of these lines may need to be tested for occupancy using, for example, the algorithm discussed above. In addition, each line may be associated with a given radius that represents the thickness of the corresponding link of the robot arm. Thus, link 520 may have a radius 512, link 520 may have a radius 522, and link 530 may have a radius 532. Then, when collision checker 130 tests each of the lines 510a, 520a, and 520b, it may use the corresponding link radius 512a, 522a, and 522b to capture the volume around the line representing the three-dimensional nature of the robot arm.

As noted above in discussing the WIRE_TREE algorithm, the collision checker 130 may interpolate points between the random configuration ($q_r$) and the closest configuration ($q_{closest}$) to be tested for occupancy. The interpolation is discretized with a fixed step to form discrete points between $q_r$ and $q_{closest}$ in the set Q, where $Q=[q_r, q_{r0}, q_{r1}, \ldots, q_{closest}]$. For each element in the set Q, the collision checker 130 may determine the direct kinetics for each of the robot's links using as examples, screw theory, geometric identities, Denavit Hartenberg (DH) parameters, etc. The direct kinetics provide a cartesian position of each robot link for all the possible configurations for each element in the set Q. Then, for each line representing each one of the robot links (e.g., for each "stick" in the stick-figure representation discussed above with respect to FIG. 5) and its associated radius, the collision check 130 may perform the OCCUPANCY_CHECK on the line, as discussed above. If any single line fails to pass the occupancy check (e.g., OCCUPANCY_CHECK returns a "false" indicating the line is not collision free), then this particular configuration would generate a collision, and the WIRE_TREE function will reject this $q_r$.

The collision checker 130 may also use the OCCUPANCY_CHECK algorithm in response to a collision checking request from the action handler 200, before the action handler 200 forwards the next state x(t) to the motion controller, using the most recent map representation of occupancy information, which it may have refreshed more recently than the time at which it originally planned the trajectory. If the occupancy check returns a collision, the action handler 200 will learn that the next trajectory state is no longer valid (e.g., it is now unsafe) and may request a new motion plan that takes into account updated occupancy information.

As noted above with respect to FIG. 1, once the path planner 150 has determined a series of collision-free waypoints from the starting state to the target state, a trajectory generator 160 may utilize these waypoints to plan the trajectory of the robot along the series of collision-free waypoints. The trajectory should fulfill the inherent, dynamic constraints of the robot. To do so, the trajectory generator 160 may take the waypoints as an input. As noted earlier, the state space for all of the joints of the robot may be represented by x(t), defined by any of the angular position $q_n(t)$, the angular velocity $\dot{q}_n(t)$, the angular acceleration $\ddot{q}_n(t)$, the angular jerk $\dddot{q}_n(t)$, and the angular snap $$q_n^{(4)}(t)$$

for each joint, where n indicates the corresponding degree of freedom (e.g., for 7 degrees of freedom, n will range from 1 to 7). The trajectory generator 160 may start with an invariant set ε(t) that is stable at the origin. Then, the equilibrium point (e.g., the origin) is moved from the starting state to the first waypoint, ensuring that all the system states remain inside the invariant set. The process is repeated for all waypoints until the target state is reached. As should be appreciated, each waypoint may be associated with a number of segments, where the trajectory generator 160 may perform the process in sequence for each segment of each waypoint.

Figure 6:
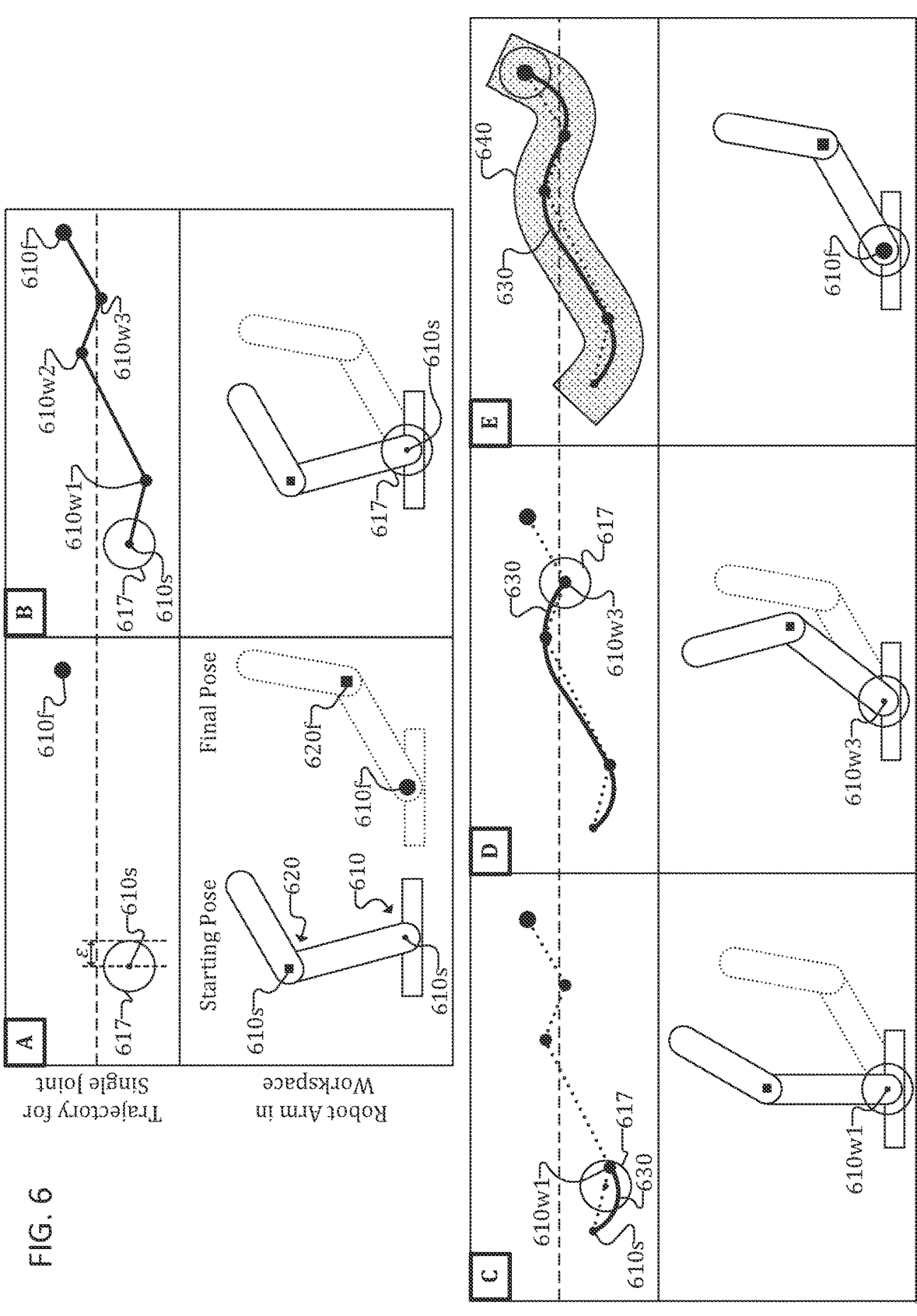
FIG. 6 shows an exemplary series of frames over time showing how a real-time motion and path planner may control a robot's joint movement along a trajectory from a starting configuration to a target configuration through determined waypoints.

FIG. 6 illustrates a series of frames (e.g., frames A, B, C, D, and E) that visualize this trajectory generation process on a simple robot with a single arm having just two-links and two joints, an upper joint 620 and a lower joint 610. The top of each frame shows the trajectory for the lower joint 610 in the configuration space and the bottom of each frame depicts the links of the robot arm in its workspace (e.g., its work environment). The trajectory for the robot is from a starting state/pose, where the upper joint 620 has a starting joint configuration 620s and the lower joint 610 has a starting joint configuration 610s, to a target state/pose, where the upper joint 620 is to have a final joint configuration 620f and the lower joint 610 is to have a final joint configuration 610f For brevity, the frames of FIG. 6 are focused on the lower joint 610, even though the trajectory generator may perform a similar process for both joints (or all joints, for a robot with additional links/joints).

The invariant set for lower joint 610 is depicted in the configuration space with boundary 617, where all locations within boundary 617 are permissible configurations (e.g., satisfies constraints on each joint's limits to position, velocity, acceleration, jerk, etc.) and stable at the center (e.g., the equilibrium point x* for each motion state of velocity, acceleration, jerk, etc.), which coincides with the starting joint configuration 610s. In frame B, the configuration space shows a series of three waypoints (first waypoint 610w1, second waypoint 610w2, and third waypoint 610w3) provided by the path planner (e.g., path planner 150), where the goal of the trajectory generator is to generate a sequence of joint configurations that the controller may use to move the robot through the planned waypoints to the final configuration.

Frames C and D show the progress of the robot arms as they move along the planned trajectory, where frame C shows the robot at the first waypoint 610w1 having had an actual trajectory 630 and frame C shows the robot at the third waypoint 610w3 (there is no separate frame for second waypoint 610w3) having had an actual trajectory 630 that now shows actual configurations up to the third waypoint 610w3. In frame E, joint 610 has arrived at its final joint configuration 610f after the actual trajectory 630 has moved through all of the waypoints. As can be seen, the actual trajectory 630 does not necessarily follow a straight line between waypoints. The equilibrium point x* is initially selected as x*=[η, 0, . . . , 0], where η corresponds to first waypoint 610w1. The trajectory planner may parametrize η with a continuous, positive, and non-decreasing function s(t) to control the progress of the equilibrium point along the path. For each waypoint, the trajectory planner operates under the condition ṡ(t)≥0, which means that the equilibrium moves along the path while ensuring the trajectory is within the invariant set (e.g., inside boundary 617 and therefore fulfilling the constraints on the joint positions, velocities, accelerations, etc. of the robot). As shown in frame E, this ensures that actual trajectory 630 stays within region 640 from the starting configuration to the final configuration. In addition, the trajectory planner may impose a maximum contouring error ($e_p$), which is the maximum allowed error of the angular position to the original waypoint provided by the path planner. Depending on selection of ṡ(t), the trajectory planner may traverse the waypoints while maintaining configuration states that are inside ε(t). One example of ṡ(t) may be given by the formula:

$$\dot{s}(t) = \frac{\theta b \gamma}{\|\mu\|}$$

where $$b = \min\{e_p, V_b, A_b, J_b\}$$

In the formula above, $0<\theta<1$, $\gamma$ is a constant that may depend on a control input (e.g., based on controlling, for example, the snap), and $\|\mu\|=[w_1-w_0, 0, \ldots, 0]$ which is the distance between subsequent waypoints, for all waypoints, where $V_b, A_b, J_b$ represent predetermined boundaries for maximum velocity, acceleration, jerk, etc. The trajectory planner may select a control input (e.g., based on limits to the allowed snap) to enhance the invariant set to match the maximum bounds. As one example in the case of a robot manipulator, the trajectory planner may select the snap control input to be, for example:

$$u(t)=-12e_p(t)-21v(t)-10a(t)$$

and, the condition for the invariant set to be:

$$\dot{s} = \frac{10}{\|\mu\|}$$

Figure 7:
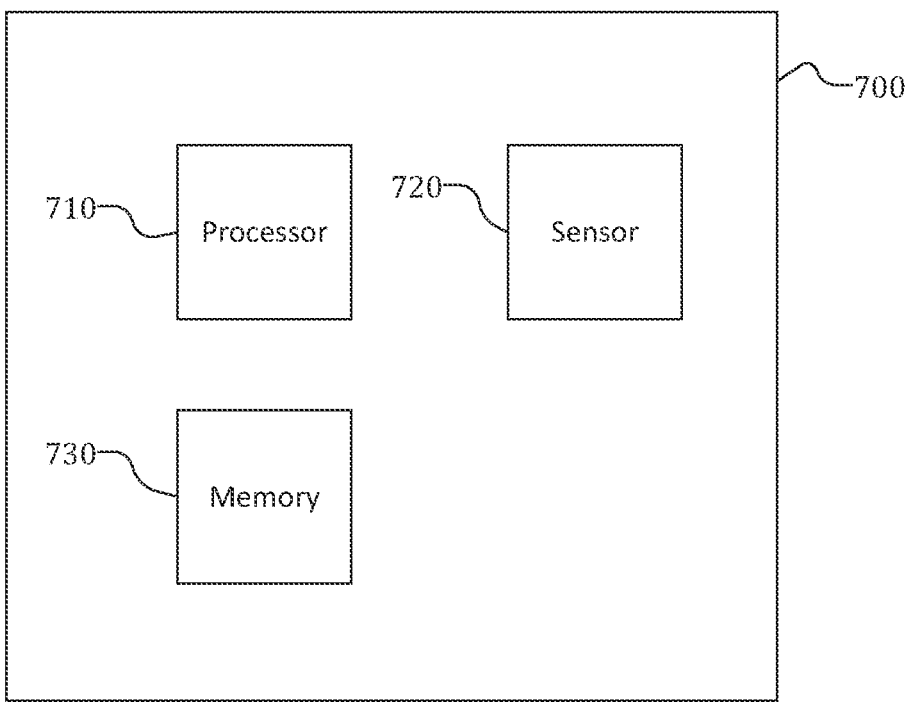
FIG. 7 illustrates an exemplary schematic drawing of a real-time motion and path planner.

FIG. 7 is a schematic drawing illustrating a device 700 for real-time motion and path planning. The device 700 may include any of the features discussed above with respect to real-time motion and path planning (e.g., real-time motion and path planner 100, action handler 200) and any of FIGS. 1-6. FIG. 7 may be implemented as a device, a system, a method, and/or a computer readable medium that, when executed, performs the features of the real-time motion and path planning described above. It should be understood that device 700 is only an example, and other configurations may be possible that include, for example, different components or additional components.

Device 700 includes a processor 710. In addition to or in combination with any of the features described in this or the following paragraphs, the processor 710 of device 700 may be configured to generate occupancy information about an environment around a robot, wherein the occupancy information represents defined volumes of space of the environment, wherein each defined volume of space is associated with a corresponding probability of whether the defined volume of space is occupied. In addition to or in combination with any of the features described in this or the following paragraphs, processor 710 is further configured to determine a sequence of robot configurations between a starting configuration and a target configuration based on the occupancy information, wherein the sequence of robot configurations defines poses of the robot that occupy selected ones of the defined volumes of space in which the corresponding probability satisfies a predefined criterion. In addition to or in combination with any of the features described in this or the following paragraphs, processor 710 is further configured to generate an instruction for the robot based on the sequence of robot configurations, wherein the instruction includes trajectory information to control the robot to move from the starting configuration to the target configuration through the sequence of robot configurations.

Furthermore, in addition to or in combination with any one of the features of this and/or the preceding paragraph with respect to device 700, processor 710 may be further configured to transmit the instruction to the robot in order to control movements of the robot along the sequence of robot configurations to the target configuration. Furthermore, in addition to or in combination with any one of the features of this and/or the preceding paragraph with respect to device 700, the defined volumes of space of the environment may include a linear octree of axes-aligned bounding boxes (e.g. voxels) with multiple levels. Furthermore, in addition to or in combination with any one of the features of this and/or the preceding paragraph with respect to device 700, each box of the linear octree of axes-aligned bounding boxes may be associated with a corresponding level of the multiple levels, a corresponding center coordinate of the box, and a corresponding radius of the box. Furthermore, in addition to or in combination with any one of the features of this and/or the preceding paragraph with respect to device 700, the axes-aligned bounding boxes may include a set of child bounding boxes of a parent bounding box, wherein the parent bounding box has a first volume and is associated with a first level of the multiple levels, wherein each child bounding box of the set of child bounding boxes is at a second level and has a second volume that together for the set of child bounding boxes includes the first volume.

Furthermore, in addition to or in combination with any one of the features of this and/or the preceding two paragraphs with respect to device 700, processor 710 may be further configured to receive sensor information about the environment that is within a reachable set of motions of the robot. Furthermore, in addition to or in combination with any one of the features of this and/or the preceding two paragraphs with respect to device 700, processor 710 may be further configured to determine the corresponding probability based on the sensor information (e.g. via sensor 720 (e.g. a camera, a depth sensor, a LiDAR sensor, etc.)). Furthermore, in addition to or in combination with any one of the features of this and/or the preceding two paragraphs with respect to device 700, the corresponding probability may further include a corresponding unoccupied probability of whether the defined volume of space is unoccupied, wherein the predefined criterion further includes whether the corresponding unoccupied probability satisfies a predefined unoccupied criterion. Furthermore, in addition to or in combination with any one of the features of this and/or the preceding two paragraphs with respect to device 700, the corresponding probability may further include a corresponding unknown status probability of whether the defined volume of space has an unknown occupancy, wherein the predefined criterion further includes whether the corresponding unknown status probability satisfies a predefined unknown status criterion.

Furthermore, in addition to or in combination with any one of the features of this and/or the preceding three paragraphs with respect to device 700, the occupancy information may further include a positional coordinate for each one of the defined volumes of space, wherein the positional coordinate is in a same coordinate system as the robot configurations. Furthermore, in addition to or in combination with any one of the features of this and/or the preceding three paragraphs with respect to device 700, the starting configuration, target configuration, and robot configurations may each include a set of joint positions for each movable joint of the robot. Furthermore, in addition to or in combination with any one of the features of this and/or the preceding three paragraphs with respect to device 700, processor 710 may be further configured to determine the set of joint positions of the target configuration based on an inverse kinematic calculation (e.g., wherein the target configuration includes an end-effector pose). Furthermore, in addition to or in combination with any one of the features of this and/or the preceding three paragraphs with respect to device 700, processor 710 may be further configured to determine the sequence of robot configurations by an iterative search of the occupancy information to find joint positions with a shortest joint distance between the starting configuration and the target configuration.

Furthermore, in addition to or in combination with any one of the features of this and/or the preceding four paragraphs with respect to device 700, the shortest joint distance may include a sum of a plurality of joint distances, one for each movable joint of the robot. Furthermore, in addition to or in combination with any one of the features of this and/or the preceding four paragraphs with respect to device 700, the iterative search may include a uniform random sample of permissible configurations and neighboring nodes of the uniform random sample within a predefined radius from a starting node in the defined volumes of space to determine a nearest connecting node of the neighboring nodes where the corresponding probability satisfies the predefined threshold, wherein at least two of the configurations include the starting node and the nearest connecting node. Furthermore, in addition to or in combination with any one of the features of this and/or the preceding four paragraphs with respect to device 700, the neighboring nodes and the uniform random sample of permissible configurations may include only permissible joint configurations of the robot. Furthermore, in addition to or in combination with any one of the features of this and/or the preceding four paragraphs with respect to device 700, the robot configurations may include at least one of an angular position, an angular velocity, an angular acceleration, an angular jerk, and an angular snap of at least one joint of the robot.

Furthermore, in addition to or in combination with any one of the features of this and/or the preceding five paragraphs with respect to device 700, each of the poses may include a set of coordinates for each corresponding link of the robot, wherein each coordinate of the set of coordinates corresponds to a joint of the corresponding link, wherein processor 710 may be further configured to determine the selected ones of the defined volumes of space based on a line between coordinates in the set for the corresponding link and based on a radius of the corresponding link. Furthermore, in addition to or in combination with any one of the features of this and/or the preceding five paragraphs with respect to device 700, processor 710 may be further configured to receive a request for motion planning at a request time, wherein processor 710 may be configured to determine the starting configuration at a starting time that is after the request time. Furthermore, in addition to or in combination with any one of the features of this and/or the preceding five paragraphs with respect to device 700, the difference between the starting time and the request time may be longer than a processing time for processor 710 to generate the instruction.

Furthermore, in addition to or in combination with any one of the features of this and/or the preceding six paragraphs with respect to device 700, processor 710 may be further configured to generate the occupancy information about the environment based on differences between a previous set of occupancy information and a current set of occupancy information. Furthermore, in addition to or in combination with any one of the features of this and/or the preceding six paragraphs with respect to device 700, the trajectory information may include at least one of an angular position, an angular velocity, an angular acceleration, an angular jerk, and an angular snap for at least one link of the robot. Furthermore, in addition to or in combination with any one of the features of this and/or the preceding six paragraphs with respect to device 700, processor 710 may be further configured to determine the trajectory information based on at least one constraint from among: a maximum angular velocity of at least one link of the robot, a maximum angular acceleration of the at least one link of the robot, a maximum angular jerk of the at least one link of the robot, and a maximum contouring error between an angular position at a next waypoint in the sequence of robot configurations and a previous waypoint in the sequence of robot configurations.

Furthermore, in addition to or in combination with any one of the features of this and/or the preceding seven paragraphs with respect to device 700, processor 710 may be further configured to determine the trajectory information based on an invariant set of permitted combinations of joint configurations of the robot. Furthermore, in addition to or in combination with any one of the features of this and/or the preceding seven paragraphs with respect to device 700, processor 710 configured to determine the trajectory information may include processor 710 configured to select a combination of joint configurations from the set of permitted combinations of joint configurations based on moving an equilibrium point of the invariant set along the sequence of robot configurations. Furthermore, in addition to or in combination with any one of the features of this and/or the preceding seven paragraphs, device 700 may further include a memory 730 configured to store at least one of: the occupancy information, the trajectory information, the sequence of robot configurations, and the instructions.

FIG. 8 depicts a schematic flow diagram of a method 800 for real-time motion and path planning for a robot. Method 800 may implement any of the real-time motion and path planning features described above with respect to real-time motion and path planner 100, action handler 200, device 700, and any of FIGS. 1-7.

Method 800 includes, in 810, generating occupancy information about an environment around a robot, wherein the occupancy information represents defined volumes of space of the environment, wherein each defined volume of space is associated with a corresponding probability of whether the defined volume of space is occupied. Method 800 also includes, in 820, determining a sequence of robot configurations between a starting configuration and a target configuration based on the occupancy information, wherein the sequence of robot configurations defines poses of the robot that occupy selected ones of the defined volumes of space in which the corresponding probability satisfies a predefined criterion. Method 800 also includes, in 830, generating an instruction for the robot based on the sequence of robot configurations, wherein the instruction includes trajectory information to control the robot to move from the starting configuration to the target configuration through the sequence of robot configurations.

In the following, various examples are provided that may include one or more aspects described above with reference to real-time motion and path planner 100, action handler 200, device 700, method 800, and any of FIGS. 1-8. The examples provided in relation to the devices may apply also to the described method(s), and vice versa.

Example 1 is a device including a processor configured to generate occupancy information about an environment around a robot, wherein the occupancy information represents defined volumes of space of the environment, wherein each defined volume of space is associated with a corresponding probability of whether the defined volume of space is occupied. The device is further configured to determine a sequence of robot configurations between a starting configuration and a target configuration based on the occupancy information, wherein the sequence of robot configurations defines poses of the robot that occupy selected ones of the defined volumes of space in which the corresponding probability satisfies a predefined criterion. The device is further configured to generate an instruction for the robot based on the sequence of robot configurations, wherein the instruction includes trajectory information to control the robot to move from the starting configuration to the target configuration through the sequence of robot configurations.

Example 2 is the device of example 1, wherein the processor is further configured to transmit the instruction to the robot in order to control movements of the robot along the sequence of robot configurations to the target configuration.

Example 3 is the device of either example 1 or 2, wherein the defined volumes of space of the environment include a linear octree of axes-aligned bounding boxes (e.g. voxels) with multiple levels.

Example 4 is the device of example 3, wherein each box of the linear octree of axes-aligned bounding boxes is associated with a corresponding level of the multiple levels, a corresponding center coordinate of the box, and a corresponding radius of the box.

Example 5 is the device of either of examples 3 or 4, wherein the axes-aligned bounding boxes include a set of child bounding boxes of a parent bounding box, wherein the parent bounding box has a first volume and is associated with a first level of the multiple levels, wherein each child bounding box of the set of child bounding boxes is at a second level and has a second volume that together for the set of child bounding boxes includes the first volume.

Example 6 is the device of any one of examples 1 to 5, wherein the processor is further configured to receive sensor information about the environment that is within a reachable set of motions of the robot.

Example 7 is the device of example 6, wherein the processor is further configured to determine the corresponding probability based on the sensor information (e.g. via a sensor (e.g. a camera, a depth sensor, a LiDAR sensor, etc.)).

Example 8 is the device of any one of examples 1 to 7, wherein the corresponding probability further includes a corresponding unoccupied probability of whether the defined volume of space is unoccupied, wherein the predefined criterion further includes whether the corresponding unoccupied probability satisfies a predefined unoccupied criterion.

Example 9 is the device of any one of examples 1 to 8, wherein the corresponding probability further includes a corresponding unknown status probability of whether the defined volume of space has an unknown occupancy, wherein the predefined criterion further includes whether the corresponding unknown status probability satisfies a predefined unknown status criterion.

Example 10 is the device of any one of examples 1 to 9, wherein the occupancy information further includes a positional coordinate for each one of the defined volumes of space, wherein the positional coordinate is in a same coordinate system as the robot configurations.

Example 11 is the device of any one of examples 1 to 10, wherein the starting configuration, target configuration, and robot configurations each include a set of joint positions for each movable joint of the robot.

Example 12 is the device of example 11, wherein the processor is further configured to determine the set of joint positions of the target configuration based on an inverse kinematic calculation (e.g., wherein the target configuration includes an end-effector pose).

Example 13 is the device of any one of examples 1 to 12, wherein the processor is further configured to determine the sequence of robot configurations by an iterative search of the occupancy information to find joint configurations with a shortest joint distance between the starting configuration and the target configuration.

Example 14 is the device of example 13, wherein the shortest joint distance includes a sum of a plurality of joint distances, one for each movable joint of the robot.

Example 15 is the device of either one of examples 13 or 14, wherein the iterative search includes a uniform random sample of permissible configurations and neighboring nodes of the uniform random sample within a predefined radius from a starting node in the defined volumes of space to determine a nearest connecting node of the neighboring nodes where the corresponding probability satisfies the predefined threshold, wherein at least two of the configurations include the starting node and the nearest connecting node.

Example 16 is the device of example 15, wherein the neighboring nodes and the uniform random sample of permissible configurations include only permissible joint configurations of the robot.

Example 17 is the device of any one of examples 1 to 16, wherein the robot configurations include at least one of an angular position, an angular velocity, an angular acceleration, an angular jerk, and an angular snap of at least one joint of the robot.

Example 18 is the device of any one of examples 1 to 17, wherein each of the poses includes a set of coordinates for each corresponding link of the robot, wherein each coordinate of the set of coordinates corresponds to a joint of the corresponding link, wherein the processor is further configured to determine the selected ones of the defined volumes of space based on a line between coordinates in the set for the corresponding link and based on a radius of the corresponding link.

Example 19 is the device of any one of examples 1 to 18, wherein the processor is further configured to receive a request for motion planning at a request time, wherein the processor is configured to determine the starting configuration at a starting time that is after the request time.

Example 20 is the device of example 19, wherein the difference between the starting time and the request time is longer than a processing time for the processor to generate the instruction.

Example 21 is the device of any one of examples 1 to 20, wherein the processor is further configured to generate the occupancy information about the environment based on differences between a previous set of occupancy information and a current set of occupancy information.

Example 22 is the device of any one of examples 1 to 21, wherein the trajectory information includes at least one of an angular position, an angular velocity, an angular acceleration, an angular jerk, and an angular snap for at least one link of the robot.

Example 23 is the device of any one of examples 1 to 22, wherein the processor is further configured to determine the trajectory information based on at least one constraint from among: a maximum angular velocity of at least one link of the robot, a maximum angular acceleration of the at least one link of the robot, a maximum angular jerk of the at least one link of the robot, and a maximum contouring error between an angular position at a next waypoint in the sequence of robot configurations and a previous waypoint in the sequence of robot configurations.

Example 24 is the device of any one of examples 1 to 23, wherein the processor is further configured to determine the trajectory information based on an invariant set of permitted combinations of joint configurations of the robot.

Example 25 is the device of example 24, wherein the processor configured to determine the trajectory information includes the processor configured to select a combination of joint configurations from the set of permitted combinations of joint configurations based on moving an equilibrium point of the invariant set along the sequence of robot configurations.

Example 26 is the device of any one of examples 1 to 25, further including a memory configured to store at least one of: the occupancy information, the trajectory information, the sequence of robot configurations, and the instructions.

Example 27 is an apparatus that includes an environment mapping circuit configured to generate occupancy information about an environment around a robot, wherein the occupancy information represents defined volumes of space of the environment, wherein each defined volume of space is associated with a corresponding probability of whether the defined volume of space is occupied. The apparatus also includes a path planning circuit configured to determine a sequence of robot configurations between a starting configuration and a target configuration based on the occupancy information, wherein the sequence of robot configurations defines poses of the robot that occupy selected ones of the defined volumes of space in which the corresponding probability satisfies a predefined criterion. The apparatus also includes a trajectory planning circuit configured to generate an instruction for the robot based on the sequence of robot configurations, wherein the instruction includes trajectory information to control the robot to move from the starting configuration to the target configuration through the sequence of robot configurations.

Example 28 is the apparatus of example 27, the apparatus further including a transmitter configured to transmit the instruction to the robot for controlling movements of the robot along the sequence of robot configurations to the target configuration.

Example 29 is the apparatus of either example 27 or 28, wherein the defined volumes of space of the environment include a linear octree of axes-aligned bounding boxes (e.g. voxels) with multiple levels.

Example 30 is the apparatus of example 29, wherein each box of the linear octree of axes-aligned bounding boxes is associated with a corresponding level of the multiple levels, a corresponding center coordinate of the box, and a corresponding radius of the box.

Example 31 is the apparatus of either of examples 29 or 30, wherein the axes-aligned bounding boxes include a set of child bounding boxes of a parent bounding box, wherein the parent bounding box has a first volume and is associated with a first level of the multiple levels, wherein each child bounding box of the set of child bounding boxes is at a second level and has a second volume that together for the set of child bounding boxes includes the first volume.

Example 32 is the apparatus of any one of examples 27 to 31, the apparatus further including a receiver configured to receive sensor information about the environment that is within a reachable set of motions of the robot.

Example 33 is the apparatus of example 32, wherein the environment mapping circuit is further configured to determine the corresponding probability based on the sensor information (e.g. via a sensor (e.g. a camera, a depth sensor, a LiDAR sensor, etc.)).

Example 34 is the apparatus of any one of examples 27 to 33, wherein the corresponding probability further includes a corresponding unoccupied probability of whether the defined volume of space is unoccupied, wherein the predefined criterion further includes whether the corresponding unoccupied probability satisfies a predefined unoccupied criterion.

Example 35 is the apparatus of any one of examples 27 to 34, wherein the corresponding probability further includes a corresponding unknown status probability of whether the defined volume of space has an unknown occupancy, wherein the predefined criterion further includes whether the corresponding unknown status probability satisfies a predefined unknown status criterion.

Example 36 is the apparatus of any one of examples 27 to 35, wherein the occupancy information further includes a positional coordinate for each one of the defined volumes of space, wherein the positional coordinate is in a same coordinate system as the robot configurations.

Example 37 is the apparatus of any one of examples 27 to 36, wherein the starting configuration, target configuration, and robot configurations each include a set of joint positions for each movable joint of the robot.

Example 38 is the apparatus of example 37, wherein the path planning circuit is further configured to determine the set of joint positions of the target configuration based on an inverse kinematic calculation (e.g., wherein the target configuration includes an end-effector pose).

Example 39 is the apparatus of any one of examples 27 to 38, wherein the path planning circuit is further configured to determine the sequence of robot configurations by an iterative search of the occupancy information to find joint positions with a shortest joint distance between the starting configuration and the target configuration.

Example 40 is the apparatus of example 39, wherein the shortest joint distance includes a sum of a plurality of joint distances, one for each movable joint of the robot.

Example 41 is the apparatus of either one of examples 39 or 40, wherein the iterative search includes a uniform random sample of permissible configurations and neighboring nodes of the uniform random sample within a predefined radius from a starting node in the defined volumes of space to determine a nearest connecting node of the neighboring nodes where the corresponding probability satisfies the predefined threshold, wherein at least two of the configurations include the starting node and the nearest connecting node.

Example 42 is the apparatus of example 41, wherein the neighboring nodes and the uniform random sample of permissible configurations include only permissible joint configurations of the robot.

Example 43 is the apparatus of any one of examples 27 to 42, wherein the robot configurations include at least one of an angular position, an angular velocity, an angular acceleration, an angular jerk, and an angular snap of at least one joint of the robot.

Example 44 is the apparatus of any one of examples 27 to 43, wherein each of the poses includes a set of coordinates for each corresponding link of the robot, wherein each coordinate of the set of coordinates corresponds to a joint of the corresponding link, wherein the path planning circuit is further configured to determine the selected ones of the defined volumes of space based on a line between coordinates in the set for the corresponding link and based on a radius of the corresponding link.

Example 45 is the apparatus of any one of examples 27 to 44, further including an action handler circuit configured to receive a request for motion planning at a request time, wherein the starting configuration is at a starting time that is after the request time.

Example 46 is the apparatus of example 45, wherein the difference between the starting time and the request time is longer than a processing time for the trajectory planning circuit to generate the instruction.

Example 47 is the apparatus of any one of examples 27 to 46, wherein the environment mapping circuit is further configured to generate the occupancy information about the environment based on differences between a previous set of occupancy information and a current set of occupancy information.

Example 48 is the apparatus of any one of examples 27 to 47, wherein the trajectory information includes at least one of an angular position, an angular velocity, an angular acceleration, an angular jerk, and an angular snap for at least one link of the robot.

Example 49 is the apparatus of any one of examples 27 to 48, wherein the trajectory planning circuit is further configured to determine the trajectory information based on at least one constraint from among: a maximum angular velocity of at least one link of the robot, a maximum angular acceleration of the at least one link of the robot, a maximum angular jerk of the at least one link of the robot, and a maximum contouring error between an angular position at a next waypoint in the sequence of robot configurations and a previous waypoint in the sequence of robot configurations.

Example 50 is the apparatus of any one of examples 27 to 49, wherein the trajectory planning circuit is further configured to determine the trajectory information based on an invariant set of permitted combinations of joint configurations of the robot.

Example 51 is the apparatus of example 50, wherein the trajectory planning circuit configured to determine the trajectory information includes the trajectory planning circuit configured to select a combination of joint configurations from the set of permitted combinations of joint configurations based on moving an equilibrium point of the invariant set along the sequence of robot configurations.

Example 52 is the apparatus of any one of examples 27 to 51, further including a memory configured to store at least one of: the occupancy information, the trajectory information, the sequence of robot configurations, and the instructions.

Example 53 is a method that includes generating occupancy information about an environment around a robot, wherein the occupancy information represents defined volumes of space of the environment, wherein each defined volume of space is associated with a corresponding probability of whether the defined volume of space is occupied. The method also includes determining a sequence of robot configurations between a starting configuration and a target configuration based on the occupancy information, wherein the sequence of robot configurations defines poses of the robot that occupy selected ones of the defined volumes of space in which the corresponding probability satisfies a predefined criterion. The method also includes generating an instruction for the robot based on the sequence of robot configurations, wherein the instruction includes trajectory information to control the robot to move from the starting configuration to the target configuration through the sequence of robot configurations.

Example 54 is the method of example 53, the method further including transmitting (e.g., via a transmitter) the instruction to the robot in order to control movements of the robot along the sequence of robot configurations to the target configuration.

Example 55 is the method of either example 53 or 54, wherein the defined volumes of space of the environment include a linear octree of axes-aligned bounding boxes (e.g. voxels) with multiple levels.

Example 56 is the method of example 55, wherein each box of the linear octree of axes-aligned bounding boxes is associated with a corresponding level of the multiple levels, a corresponding center coordinate of the box, and a corresponding radius of the box.

Example 57 is the method of either of examples 55 or 56, wherein the axes-aligned bounding boxes include a set of child bounding boxes of a parent bounding box, wherein the parent bounding box has a first volume and is associated with a first level of the multiple levels, wherein each child bounding box of the set of child bounding boxes is at a second level and has a second volume that together for the set of child bounding boxes includes the first volume.

Example 58 is the method of any one of examples 53 to 57, the method further including receiving (e.g., via a receiver) sensor information (e.g., via a sensor) about the environment that is within a reachable set of motions of the robot.

Example 59 is the method of example 58, the method further including determining the corresponding probability based on the sensor information (e.g. via a sensor (e.g. a camera, a depth sensor, a LiDAR sensor, etc.)).

Example 60 is the method of any one of examples 53 to 59, wherein the corresponding probability further includes a corresponding unoccupied probability of whether the defined volume of space is unoccupied, wherein the predefined criterion further includes whether the corresponding unoccupied probability satisfies a predefined unoccupied criterion.

Example 61 is the method of any one of examples 53 to 60, wherein the corresponding probability further includes a corresponding unknown status probability of whether the defined volume of space has an unknown occupancy, wherein the predefined criterion further includes whether the corresponding unknown status probability satisfies a predefined unknown status criterion.

Example 62 is the method of any one of examples 53 to 61, wherein the occupancy information further includes a positional coordinate for each one of the defined volumes of space, wherein the positional coordinate is in a same coordinate system as the robot configurations.

Example 63 is the method of any one of examples 53 to 62, wherein the starting configuration, target configuration, and robot configurations each include a set of joint positions for each movable joint of the robot.

Example 64 is the method of example 63, the method further including determining the set of joint positions of the target configuration based on an inverse kinematic calculation (e.g., wherein the target configuration includes an end-effector pose).

Example 65 is the method of any one of examples 53 to 64, the method further including determining the sequence of robot configurations by an iterative search of the occupancy information to find joint positions with a shortest joint distance between the starting configuration and the target configuration.

Example 66 is the method of example 65, wherein the shortest joint distance includes a sum of a plurality of joint distances, one for each movable joint of the robot.

Example 67 is the method of either one of examples 65 or 66, wherein the iterative search includes a uniform random sample of permissible configurations and neighboring nodes of the uniform random sample within a predefined radius from a starting node in the defined volumes of space to determine a nearest connecting node of the neighboring nodes where the corresponding probability satisfies the predefined threshold, wherein at least two of the configurations include the starting node and the nearest connecting node.

Example 68 is the method of example 67, wherein the neighboring nodes and the uniform random sample of permissible configurations include only permissible joint configurations of the robot.

Example 69 is the method of any one of examples 53 to 68, wherein the robot configurations include at least one of an angular position, an angular velocity, an angular acceleration, an angular jerk, and an angular snap of at least one joint of the robot.

Example 70 is the method of any one of examples 53 to 69, wherein each of the poses includes a set of coordinates for each corresponding link of the robot, wherein each coordinate of the set of coordinates corresponds to a joint of the corresponding link, the method further including determining the selected ones of the defined volumes of space based on a line between coordinates in the set for the corresponding link and based on a radius of the corresponding link.

Example 71 is the method of any one of examples 53 to 70, the method further including receiving a request for motion planning at a request time and determining the starting configuration at a starting time that is after the request time.

Example 72 is the method of example 71, wherein the difference between the starting time and the request time is longer than a processing time for the method to generate the instruction.

Example 73 is the method of any one of examples 53 to 72, the method further including generating the occupancy information about the environment based on differences between a previous set of occupancy information and a current set of occupancy information.

Example 74 is the method of any one of examples 53 to 73, wherein the trajectory information includes at least one of an angular position, an angular velocity, an angular acceleration, an angular jerk, and an angular snap for at least one link of the robot.

Example 75 is the method of any one of examples 53 to 74, the method further including determining the trajectory information based on at least one constraint from among: a maximum angular velocity of at least one link of the robot, a maximum angular acceleration of the at least one link of the robot, a maximum angular jerk of the at least one link of the robot, and a maximum contouring error between an angular position at a next waypoint in the sequence of robot configurations and a previous waypoint in the sequence of robot configurations.

Example 76 is the method of any one of examples 53 to 75, the method further including determining the trajectory information based on an invariant set of permitted combinations of joint configurations of the robot.

Example 77 is the method of example 76, wherein determining the trajectory information includes selecting a combination of joint configurations from the set of permitted combinations of joint configurations based on moving an equilibrium point of the invariant set along the sequence of robot configurations.

Example 78 is the method of any one of examples 53 to 77, the method further including storing (e.g., in a memory) at least one of: the occupancy information, the trajectory information, the sequence of robot configurations, and the instructions.

Example 79 is a device that includes a means for generating occupancy information about an environment around a robot, wherein the occupancy information represents defined volumes of space of the environment, wherein each defined volume of space is associated with a corresponding probability of whether the defined volume of space is occupied. The device also includes a means for determining a sequence of robot configurations between a starting configuration and a target configuration based on the occupancy information, wherein the sequence of robot configurations defines poses of the robot that occupy selected ones of the defined volumes of space in which the corresponding probability satisfies a predefined criterion. The device also includes a means for generating an instruction for the robot based on the sequence of robot configurations, wherein the instruction includes trajectory information to control the robot to move from the starting configuration to the target configuration through the sequence of robot configurations.

Example 80 is the device of example 79, the device further including a means for transmitting (e.g., a transmitter) the instruction to the robot in order to control movements of the robot along the sequence of robot configurations to the target configuration.

Example 81 is the device of either example 79 or 80, wherein the defined volumes of space of the environment include a linear octree of axes-aligned bounding boxes (e.g. voxels) with multiple levels.

Example 82 is the device of example 81, wherein each box of the linear octree of axes-aligned bounding boxes is associated with a corresponding level of the multiple levels, a corresponding center coordinate of the box, and a corresponding radius of the box.

Example 83 is the device of either of examples 81 or 82, wherein the axes-aligned bounding boxes include a set of child bounding boxes of a parent bounding box, wherein the parent bounding box has a first volume and is associated with a first level of the multiple levels, wherein each child bounding box of the set of child bounding boxes is at a second level and has a second volume that together for the set of child bounding boxes includes the first volume.

Example 84 is the device of any one of examples 79 to 83, the device further including a means for receiving (e.g., a receiver) sensor information (e.g., via a sensing means) about the environment that is within a reachable set of motions of the robot.

Example 85 is the device of example 84, the device further including a means for determining the corresponding probability based on the sensor information (e.g. via a sensing means (e.g. a camera, a depth sensor, a LiDAR sensor, etc.)).

Example 86 is the device of any one of examples 79 to 85, wherein the corresponding probability further includes a corresponding unoccupied probability of whether the defined volume of space is unoccupied, wherein the predefined criterion further includes whether the corresponding unoccupied probability satisfies a predefined unoccupied criterion.

Example 87 is the device of any one of examples 79 to 86, wherein the corresponding probability further includes a corresponding unknown status probability of whether the defined volume of space has an unknown occupancy, wherein the predefined criterion further includes whether the corresponding unknown status probability satisfies a predefined unknown status criterion.

Example 88 is the device of any one of examples 79 to 87, wherein the occupancy information further includes a positional coordinate for each one of the defined volumes of space, wherein the positional coordinate is in a same coordinate system as the robot configurations.

Example 89 is the device of any one of examples 79 to 88, wherein the starting configuration, target configuration, and robot configurations each include a set of joint positions for each movable joint of the robot.

Example 90 is the device of example 89, the device further including a means for determining the set of joint positions of the target configuration based on an inverse kinematic calculation (e.g., wherein the target configuration includes an end-effector pose).

Example 91 is the device of any one of examples 79 to 90, the device further including a means for determining the sequence of robot configurations by an iterative search of the occupancy information to find joint positions with a shortest joint distance between the starting configuration and the target configuration.

Example 92 is the device of example 91, wherein the shortest joint distance includes a sum of a plurality of joint distances, one for each movable joint of the robot.

Example 93 is the device of either one of examples 91 or 92, wherein the iterative search includes a uniform random sample of permissible configurations and neighboring nodes of the uniform random sample within a predefined radius from a starting node in the defined volumes of space to determine a nearest connecting node of the neighboring nodes where the corresponding probability satisfies the predefined threshold, wherein at least two of the configurations include the starting node and the nearest connecting node.

Example 94 is the device of example 93, wherein the neighboring nodes and the uniform random sample of permissible configurations include only permissible joint configurations of the robot.

Example 95 is the device of any one of examples 79 to 94, wherein the robot configurations include at least one of an angular position, an angular velocity, an angular acceleration, an angular jerk, and an angular snap of at least one joint of the robot.

Example 96 is the device of any one of examples 79 to 95, wherein each of the poses includes a set of coordinates for each corresponding link of the robot, wherein each coordinate of the set of coordinates corresponds to a joint of the corresponding link, the device further including a means for determining the selected ones of the defined volumes of space based on a line between coordinates in the set for the corresponding link and based on a radius of the corresponding link.

Example 97 is the device of any one of examples 79 to 96, the device further including a means for receiving (e.g., via a receiver) a request for motion planning at a request time and a means for determining the starting configuration at a starting time that is after the request time.

Example 98 is the device of example 97, wherein the difference between the starting time and the request time is longer than a processing time for the device to generate the instruction.

Example 99 is the device of any one of examples 79 to 98, the device further including a means for generating the occupancy information about the environment based on differences between a previous set of occupancy information and a current set of occupancy information.

Example 100 is the device of any one of examples 79 to 99, wherein the trajectory information includes at least one of an angular position, an angular velocity, an angular acceleration, an angular jerk, and an angular snap for at least one link of the robot.

Example 101 is the device of any one of examples 79 to 100, the device further including a means for determining the trajectory information based on at least one constraint from among: a maximum angular velocity of at least one link of the robot, a maximum angular acceleration of the at least one link of the robot, a maximum angular jerk of the at least one link of the robot, and a maximum contouring error between an angular position at a next waypoint in the sequence of robot configurations and a previous waypoint in the sequence of robot configurations.

Example 102 is the device of any one of examples 79 to 101, the device further including a means for determining the trajectory information based on an invariant set of permitted combinations of joint configurations of the robot.

Example 103 is the device of example 102, wherein the means for determining the trajectory information includes a means for selecting a combination of joint configurations from the set of permitted combinations of joint configurations based on moving an equilibrium point of the invariant set along the sequence of robot configurations.

Example 104 is the device of any one of examples 79 to 103, the device further including a means for storing (e.g., in a memory) at least one of: the occupancy information, the trajectory information, the sequence of robot configurations, and the instructions.

Example 105 is a non-transitory computer readable medium that includes instructions which, if executed, cause one or more processors to generate occupancy information about an environment around a robot, wherein the occupancy information represents defined volumes of space of the environment, wherein each defined volume of space is associated with a corresponding probability of whether the defined volume of space is occupied. The instructions also cause the one or more processors to determine a sequence of robot configurations between a starting configuration and a target configuration based on the occupancy information, wherein the sequence of robot configurations defines poses of the robot that occupy selected ones of the defined volumes of space in which the corresponding probability satisfies a predefined criterion. The instructions also cause the one or more processors to generate an instruction for the robot based on the sequence of robot configurations, wherein the instruction includes trajectory information to control the robot to move from the starting configuration to the target configuration through the sequence of robot configurations.

Example 106 is the non-transitory computer readable medium of example 105, wherein the instructions also cause the one or more processors to transmit the instruction to the robot in order to control movements of the robot along the sequence of robot configurations to the target configuration.

Example 107 is the non-transitory computer readable medium of either example 105 or 106, wherein the defined volumes of space of the environment include a linear octree of axes-aligned bounding boxes (e.g. voxels) with multiple levels.

Example 108 is the non-transitory computer readable medium of example 107, wherein each box of the linear octree of axes-aligned bounding boxes is associated with a corresponding level of the multiple levels, a corresponding center coordinate of the box, and a corresponding radius of the box.

Example 109 is the non-transitory computer readable medium of either of examples 107 or 108, wherein the axes-aligned bounding boxes include a set of child bounding boxes of a parent bounding box, wherein the parent bounding box has a first volume and is associated with a first level of the multiple levels, wherein each child bounding box of the set of child bounding boxes is at a second level and has a second volume that together for the set of child bounding boxes includes the first volume.

Example 110 is the non-transitory computer readable medium of any one of examples 105 to 109, wherein the instructions also cause the one or more processors to receive sensor information about the environment that is within a reachable set of motions of the robot.

Example 111 is the non-transitory computer readable medium of example 110, wherein the instructions also cause the one or more processors to determine the corresponding probability based on the sensor information (e.g. via a sensor (e.g. a camera, a depth sensor, a LiDAR sensor, etc.)).

Example 112 is the non-transitory computer readable medium of any one of examples 105 to 111, wherein the corresponding probability further includes a corresponding unoccupied probability of whether the defined volume of space is unoccupied, wherein the predefined criterion further includes whether the corresponding unoccupied probability satisfies a predefined unoccupied criterion.

Example 113 is the non-transitory computer readable medium of any one of examples 105 to 112, wherein the corresponding probability further includes a corresponding unknown status probability of whether the defined volume of space has an unknown occupancy, wherein the predefined criterion further includes whether the corresponding unknown status probability satisfies a predefined unknown status criterion.

Example 114 is the non-transitory computer readable medium of any one of examples 105 to 113, wherein the occupancy information further includes a positional coordinate for each one of the defined volumes of space, wherein the positional coordinate is in a same coordinate system as the robot configurations.

Example 115 is the non-transitory computer readable medium of any one of examples 105 to 114, wherein the starting configuration, target configuration, and robot configurations each include a set of joint positions for each movable joint of the robot.

Example 116 is the non-transitory computer readable medium of example 115, wherein the instructions also cause the one or more processors to determine the set of joint positions of the target configuration based on an inverse kinematic calculation (e.g., wherein the target configuration includes an end-effector pose).

Example 117 is the non-transitory computer readable medium of any one of examples 105 to 116, wherein the instructions also cause the one or more processors to determine the sequence of robot configurations by an iterative search of the occupancy information to find joint positions with a shortest joint distance between the starting configuration and the target configuration.

Example 118 is the non-transitory computer readable medium of example 117, wherein the shortest joint distance includes a sum of a plurality of joint distances, one for each movable joint of the robot.

Example 119 is the non-transitory computer readable medium of either one of examples 117 or 118, wherein the iterative search includes a uniform random sample of permissible configurations and neighboring nodes of the uniform random sample within a predefined radius from a starting node in the defined volumes of space to determine a nearest connecting node of the neighboring nodes where the corresponding probability satisfies the predefined threshold, wherein at least two of the configurations include the starting node and the nearest connecting node.

Example 120 is the non-transitory computer readable medium of example 119, wherein the neighboring nodes and the uniform random sample of permissible configurations include only permissible joint configurations of the robot.

Example 121 is the non-transitory computer readable medium of any one of examples 105 to 120, wherein the robot configurations include at least one of an angular position, an angular velocity, an angular acceleration, an angular jerk, and an angular snap of at least one joint of the robot.

Example 122 is the non-transitory computer readable medium of any one of examples 105 to 121, wherein each of the poses includes a set of coordinates for each corresponding link of the robot, wherein each coordinate of the set of coordinates corresponds to a joint of the corresponding link, wherein the instructions also cause the one or more processors to determine the selected ones of the defined volumes of space based on a line between coordinates in the set for the corresponding link and based on a radius of the corresponding link.

Example 123 is the non-transitory computer readable medium of any one of examples 105 to 122, wherein the instructions also cause the one or more processors to receive a request for motion planning at a request time, wherein the instructions also cause the one or more processors to determine the starting configuration at a starting time that is after the request time.

Example 124 is the non-transitory computer readable medium of example 123, wherein the difference between the starting time and the request time is longer than a processing time for the one or more processors to generate the instruction.

Example 125 is the non-transitory computer readable medium of any one of examples 105 to 124, wherein the instructions also cause the one or more processors to generate the occupancy information about the environment based on differences between a previous set of occupancy information and a current set of occupancy information.

Example 126 is the non-transitory computer readable medium of any one of examples 105 to 125, wherein the trajectory information includes at least one of an angular position, an angular velocity, an angular acceleration, an angular jerk, and an angular snap for at least one link of the robot.

Example 127 is the non-transitory computer readable medium of any one of examples 105 to 126, wherein the instructions also cause the one or more processors to determine the trajectory information based on at least one constraint from among: a maximum angular velocity of at least one link of the robot, a maximum angular acceleration of the at least one link of the robot, a maximum angular jerk of the at least one link of the robot, and a maximum contouring error between an angular position at a next waypoint in the sequence of robot configurations and a previous waypoint in the sequence of robot configurations.

Example 128 is the non-transitory computer readable medium of any one of examples 105 to 127, wherein the instructions also cause the one or more processors to determine the trajectory information based on an invariant set of permitted combinations of joint configurations of the robot.

Example 129 is the non-transitory computer readable medium of example 128, wherein the instructions that cause the one or more processors to determine the trajectory information includes instructions that also cause the one or more processors to select a combination of joint configurations from the set of permitted combinations of joint configurations based on moving an equilibrium point of the invariant set along the sequence of robot configurations.

Example 130 is the non-transitory computer readable medium of any one of examples 105 to 129, further including a memory configured to store at least one of: the occupancy information, the trajectory information, the sequence of robot configurations, and the instructions.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

The invention claimed is:

1. A device comprising a processor configured to:

generate occupancy information about an environment around a robot, wherein the occupancy information represents defined volumes of space of the environment, wherein each defined volume of space is associated with a corresponding probability of whether the defined volume of space is occupied, wherein the defined volumes of space comprise a linear octree of axes-aligned bounding boxes with multiple levels, wherein each bounding box is associated with a corresponding level of the multiple levels and associated with a unique key for identifying the bounding box, wherein the unique key encodes the corresponding level, a radius of the bounding box at the corresponding level, and a center coordinate of the bounding box at the corresponding level;

determine a sequence of robot configurations between a starting configuration and a target configuration based on the occupancy information, wherein the sequence of robot configurations defines poses of the robot that occupy selected ones of the defined volumes of space in which the corresponding probability satisfies a predefined criterion;

generate an instruction for the robot based on the sequence of robot configurations, wherein the instruction comprises trajectory information to control the robot to move from the starting configuration to the target configuration through the sequence of robot configurations; and control movements of the robot according to the instruction.

2. The device of claim 1, wherein the processor is further configured to transmit the instruction to the robot in order to control the movements of the robot along the sequence of robot configurations to the target configuration.

3. The device of claim 1, wherein the processor is further configured to receive sensor information about the environment that is within a reachable set of motions of the robot.

4. The device of claim 1, wherein the occupancy information further comprises a positional coordinate for each one of the defined volumes of space, wherein the positional coordinate is in a same coordinate system as the robot configurations.

5. The device of claim 1, wherein the starting configuration, target configuration, and robot configurations each comprise a set of joint configurations for each movable joint of the robot.

6. The device of claim 1, wherein the robot configurations comprise at least one of an angular position, an angular velocity, an angular acceleration, an angular jerk, and an angular snap of at least one joint of the robot.

7. The device of claim 1, wherein each of the poses comprises a set of coordinates for each corresponding link of the robot, wherein each coordinate of the set of coordinates corresponds to a joint of the corresponding link, wherein the processor is further configured to determine the selected ones of the defined volumes of space based on a line between coordinates in the set for the corresponding link and based on a radius of the corresponding link.

8. The device of claim 1, wherein the processor is further configured to determine the trajectory information based on at least one constraint from among: a maximum angular velocity of at least one link of the robot, a maximum angular acceleration of the at least one link of the robot, a maximum angular jerk of the at least one link of the robot, and a maximum contouring error between an angular position at a next waypoint in the sequence of robot configurations and a previous waypoint in the sequence of robot configurations.

9. The device of claim 1, wherein the processor is further configured to determine the trajectory information based on an invariant set of permitted combinations of joint configurations of the robot.

10. The device of claim 9, wherein the processor configured to determine the trajectory information comprises the processor configured to select a combination of joint configurations from the set of permitted combinations of joint configurations based on moving an equilibrium point of the invariant set along the sequence of robot configurations.

11. The device of claim 1, further comprising a memory configured to store at least one of: the occupancy information, the trajectory information, the sequence of robot configurations, and the instructions.

12. An apparatus comprising:
an environment mapping circuit configured to generate occupancy information about an environment around a robot, wherein the occupancy information represents defined volumes of space of the environment, wherein each defined volume of space is associated with a corresponding probability of whether the defined volume of space is occupied, wherein the defined volumes of space comprise a linear octree of axes-aligned bounding boxes with multiple levels, wherein each bounding box is associated with a corresponding level of the multiple levels and associated with a unique key for identifying the bounding box, wherein the unique key encodes the corresponding level, a radius of the bounding box at the corresponding level, and a center coordinate of the bounding box at the corresponding level;
a path planning circuit configured to determine a sequence of robot configurations between a starting configuration and a target configuration based on the occupancy information, wherein the sequence of robot configurations defines poses of the robot that occupy selected ones of the defined volumes of space in which the corresponding probability satisfies a predefined criterion;
a trajectory planning circuit configured to generate an instruction for the robot based on the sequence of robot configurations, wherein the instruction comprises trajectory information to control the robot to move from the starting configuration to the target configuration through the sequence of robot configurations; and
a control circuit configured to control movements of the robot according to the instruction.

13. The apparatus of claim 12, wherein the path planning circuit is further configured to determine the sequence of robot configurations by an iterative search of the occupancy information to find joint positions with a shortest joint distance between the starting configuration and the target configuration.

14. The apparatus of claim 13, wherein the shortest joint distance comprises a sum of a plurality of joint distances, one for each movable joint of the robot.

15. The apparatus of claim 13, wherein the iterative search comprises a uniform random sample of permissible configurations and neighboring nodes of the uniform random sample within a predefined radius from a starting node in the defined volumes of space to determine a nearest connecting node of the neighboring nodes where the corresponding probability satisfies a predefined threshold, wherein at least two of the configurations comprise the starting node and the nearest connecting node.

16. The apparatus of claim 15, wherein the neighboring nodes and the uniform random sample of permissible configurations comprise only permissible joint configurations of the robot.

17. The apparatus of claim 12, wherein the robot configurations comprise at least one of an angular position, an angular velocity, an angular acceleration, an angular jerk, and an angular snap of at least one joint of the robot.

18. A non-transitory computer readable medium that comprises instructions which, if executed, cause one or more processors to:
generate occupancy information about an environment around a robot, wherein the occupancy information represents defined volumes of space of the environment, wherein each defined volume of space is associated with a corresponding probability of whether the defined volume of space is occupied, wherein the defined volumes of space comprise a linear octree of axes-aligned bounding boxes with multiple levels, wherein each bounding box is associated with a corresponding level of the multiple levels and associated with a unique key for identifying the bounding box, wherein the unique key encodes the corresponding level, a radius of the bounding box at the corresponding level, and a center coordinate of the bounding box at the corresponding level;
determine a sequence of robot configurations between a starting configuration and a target configuration based on the occupancy information, wherein the sequence of robot configurations defines poses of the robot that occupy selected ones of the defined volumes of space in which the corresponding probability satisfies a predefined criterion; and
generate an instruction for the robot based on the sequence of robot configurations, wherein the instruction comprises trajectory information to control the robot to move from the starting configuration to the target configuration through the sequence of robot configurations; and control movements of the robot according to the instruction.

19. The non-transitory computer readable medium of claim 18, wherein the trajectory information comprises at least one of an angular position, an angular velocity, an angular acceleration, an angular jerk, and an angular snap for at least one link of the robot.

20. A device comprising:

a means for generating occupancy information about an environment around a robot, wherein the occupancy information represents defined volumes of space of the environment, wherein each defined volume of space is associated with a corresponding probability of whether the defined volume of space is occupied, wherein the defined volumes of space comprise a linear octree of axes-aligned bounding boxes with multiple levels, wherein each bounding box is associated with a corresponding level of the multiple levels and associated with a unique key for identifying the bounding box, wherein the unique key encodes the corresponding level, a radius of the bounding box at the corresponding level, and a center coordinate of the bounding box at the corresponding level;

a means for determining a sequence of robot configurations between a starting configuration and a target configuration based on the occupancy information, wherein the sequence of robot configurations defines poses of the robot that occupy selected ones of the defined volumes of space in which the corresponding probability satisfies a predefined criterion; and a means for generating an instruction for the robot based on the sequence of robot configurations, wherein the instruction comprises trajectory information to control the robot to move from the starting configuration to the target configuration through the sequence of robot configurations; and a means for controlling movements of the robot according to the instruction.

21. The device of claim 20, the device further comprising a means for transmitting the instruction to the robot in order to control movements of the robot along the sequence of robot configurations to the target configuration.

22. The device of claim 20, wherein the axes-aligned bounding boxes comprise a set of child bounding boxes of a parent bounding box, wherein the parent bounding box has a first volume and is associated with a first level of the multiple levels, wherein each child bounding box of the set of child bounding boxes is at a second level and has a second volume that together for the set of child bounding boxes comprises the first volume.

* * * * *